(12) United States Patent
Mizushima et al.

(10) Patent No.: US 7,859,610 B2
(45) Date of Patent: Dec. 28, 2010

(54) PLANAR LIGHTING AND LCD DEVICE WITH A LASER LIGHT SOURCE EMITTING A LINEARLY-POLARIZED LASER BEAM, OPTICAL MEMBER TO PARALLELIZE THE BEAM AND A PLATE-SHAPED LIGHT GUIDE FOR EMITTING PART OF THE BEAM

(75) Inventors: Tetsuro Mizushima, Osaka (JP); Kenichi Kasazumi, Osaka (JP); Tatsuo Itoh, Osaka (JP); Kazuhisa Yamamoto, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 12/159,309

(22) PCT Filed: Dec. 25, 2006

(86) PCT No.: PCT/JP2006/325806

§ 371 (c)(1),
(2), (4) Date: Jun. 26, 2008

(87) PCT Pub. No.: WO2007/074787

PCT Pub. Date: Jul. 5, 2007

(65) Prior Publication Data

US 2010/0220261 A1    Sep. 2, 2010

(30) Foreign Application Priority Data

Dec. 27, 2005    (JP) .............................. 2005-375672

(51) Int. Cl.
*G02F 1/1335* (2006.01)

(52) U.S. Cl. .............................. 349/61; 349/62; 349/65; 362/608; 362/611; 362/553; 362/625; 359/27; 372/50.23

(58) Field of Classification Search .................... 349/61, 349/64, 65, 67–79; 359/1–35; 362/600–634, 362/97.3; 372/50.11, 50.23
See application file for complete search history.

(56) References Cited

U.S. PATENT DOCUMENTS 5,084,860 A * 1/1992 Maeda et al. ............ 369/275.3
5,982,521 A   11/1999 Bessho et al.

(Continued)

FOREIGN PATENT DOCUMENTS

JP          62-109003        5/1987

(Continued)

OTHER PUBLICATIONS

International Preliminary Examination Report on Patentability issued Aug. 7, 2008 in PCT/JP2006/325806, including Forms PCT/IB/338 and PCT/IPEA/409 (in English).

(Continued)

*Primary Examiner*—John Heyman
(74) *Attorney, Agent, or Firm*—Wenderoth, Lind & Ponack, L.L.P.

(57) ABSTRACT

The present invention provides a planar lighting device (1) including: a laser light source (12) which emits a linearly-polarized laser beam; an optical member (13) which receives the laser beam, then parallelize the laser beam, and emits the parallelized laser beam; and a first plate-shaped light guide (20) which receives the parallelized laser beam from an end face portion (20*d*) and emits the parallelized laser beam from a first major surface (20*b*). The first light guide includes an optical element (20*a*) which receives the linearly-polarized parallelized laser beam propagated through the first light guide and emits at least a part of the linearly-polarized parallelized laser beam in a direction substantially vertical to the first major surface. The present invention also provides a liquid crystal display device (3) using the planar lighting device (1) as a backlight lighting device.

29 Claims, 20 Drawing Sheets

U.S. PATENT DOCUMENTS

| | | |
|---|---|---|
| 6,104,454 A | 8/2000 | Hiyama et al. |
| 6,196,691 B1 | 3/2001 | Ochiai |
| 6,222,598 B1 | 4/2001 | Hiyama et al. |

FOREIGN PATENT DOCUMENTS

| | | |
|---|---|---|
| JP | 9-189907 | 7/1997 |
| JP | 9-265085 | 10/1997 |
| JP | 11-287993 | 10/1999 |
| JP | 2003-215318 | 7/2003 |
| JP | 2005-19066 | 1/2005 |
| JP | 2005-64163 | 3/2005 |
| JP | 2005-157025 | 6/2005 |
| JP | 2005-243412 | 9/2005 |
| JP | 2005-300697 | 10/2005 |
| JP | 2005-332719 | 12/2005 |

PUBLICATIONS

International Search Report issued Mar. 6, 2007 in the International (PCT) Application of which the present application is the U.S. National Stage.

* cited by examiner

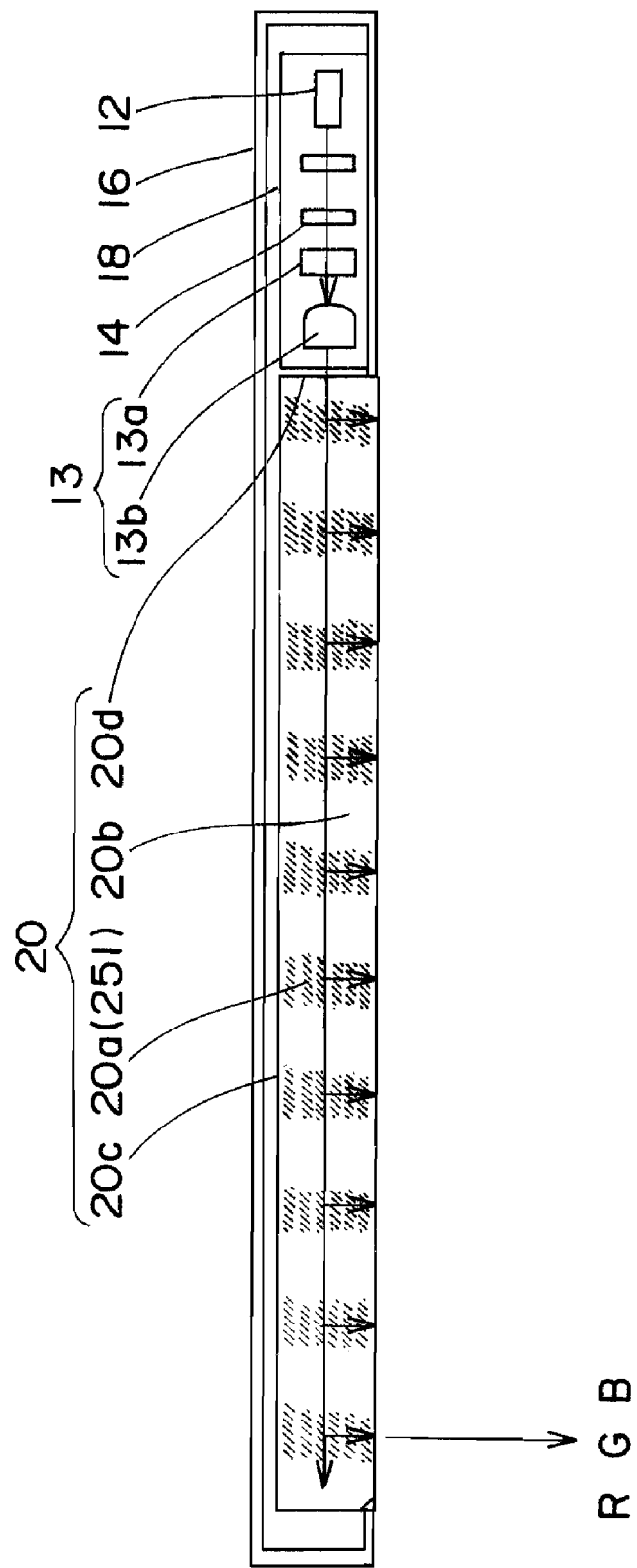

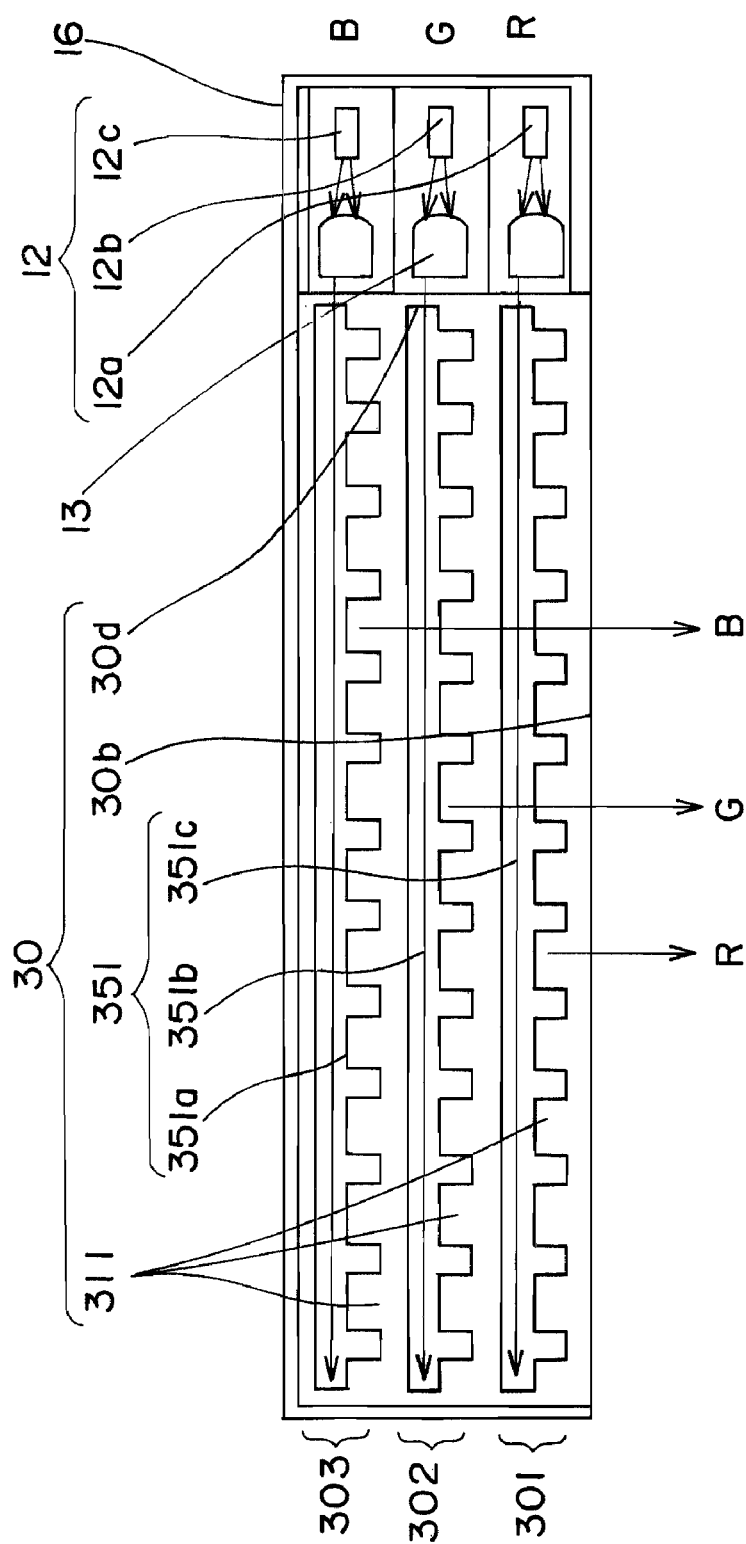

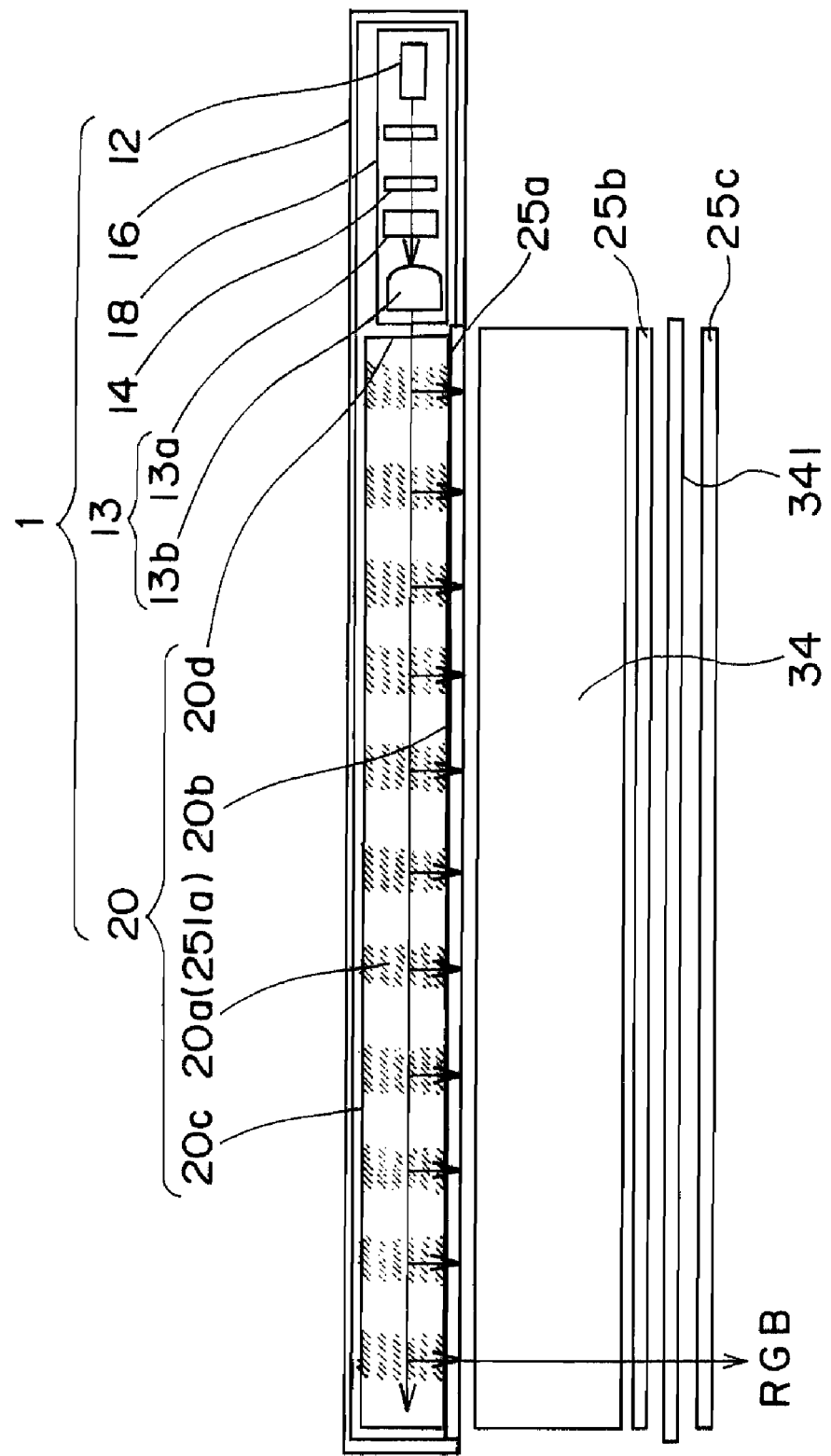

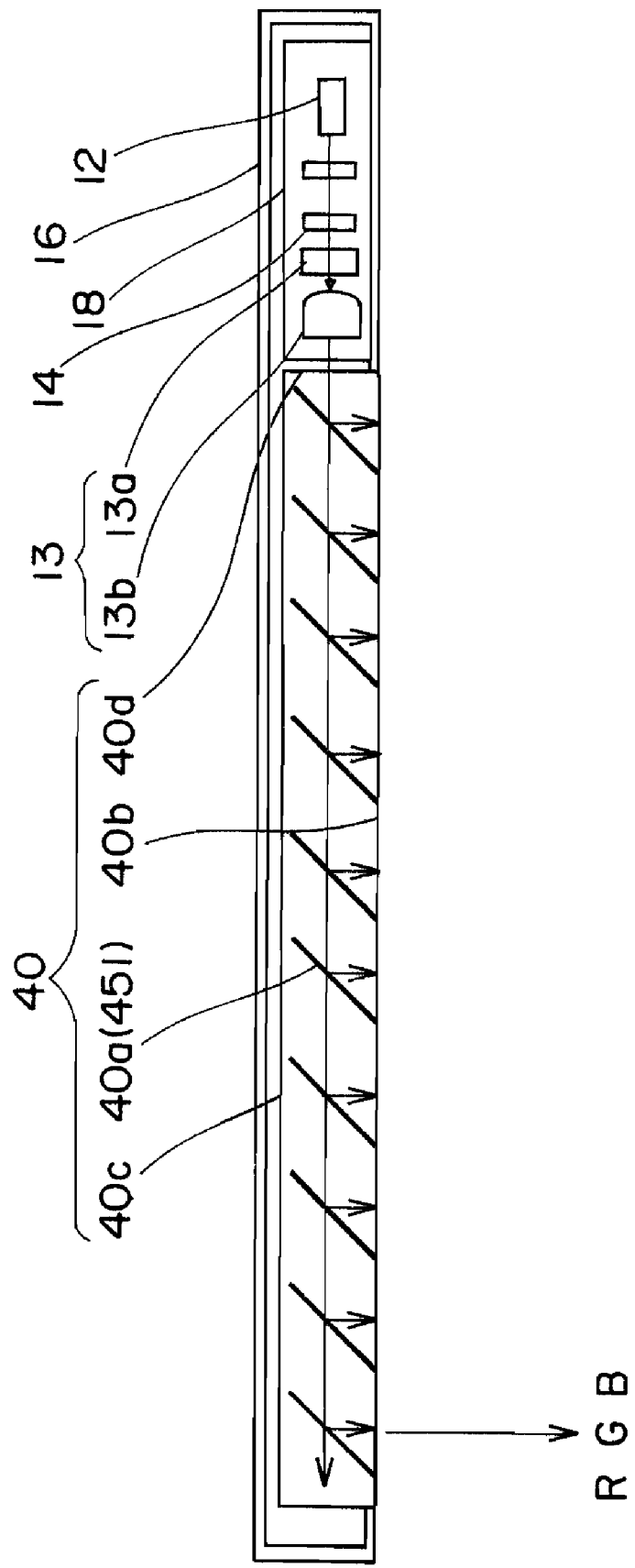

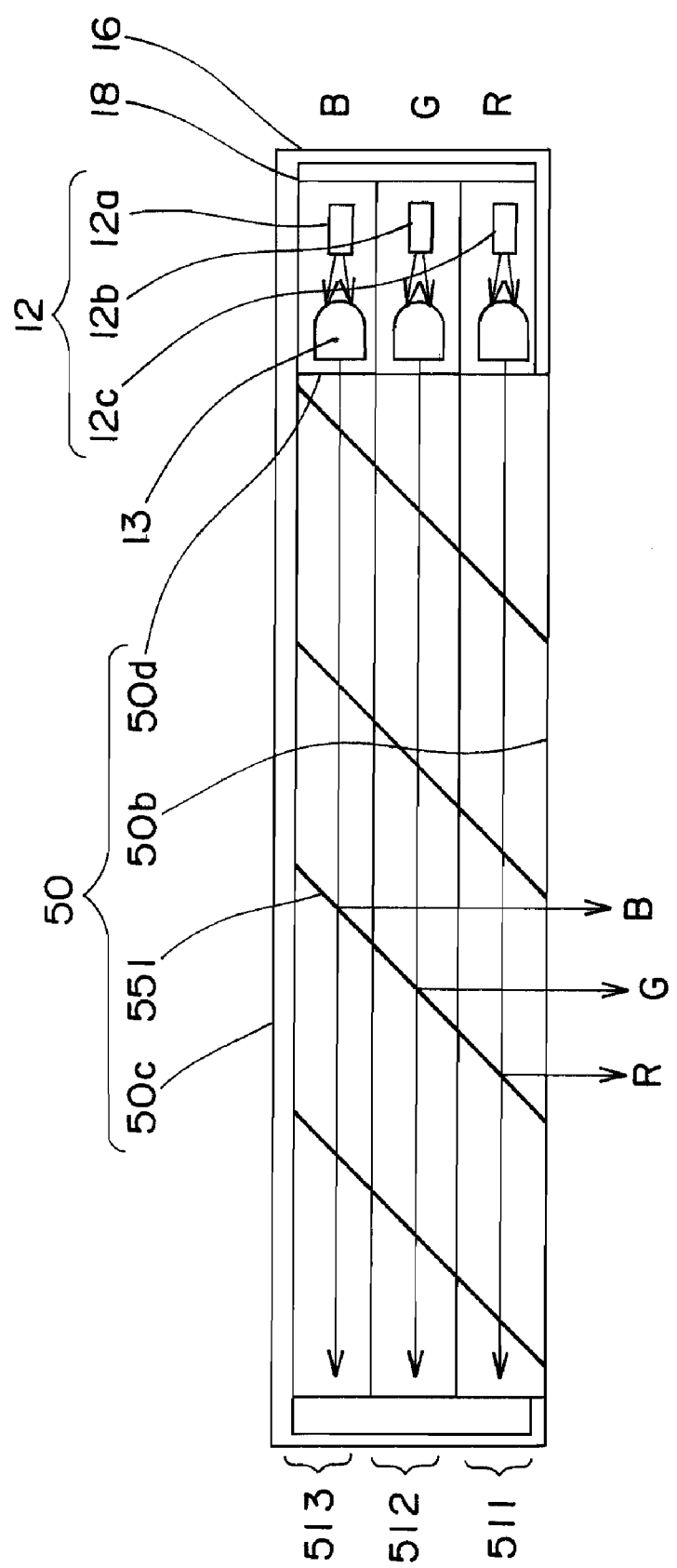

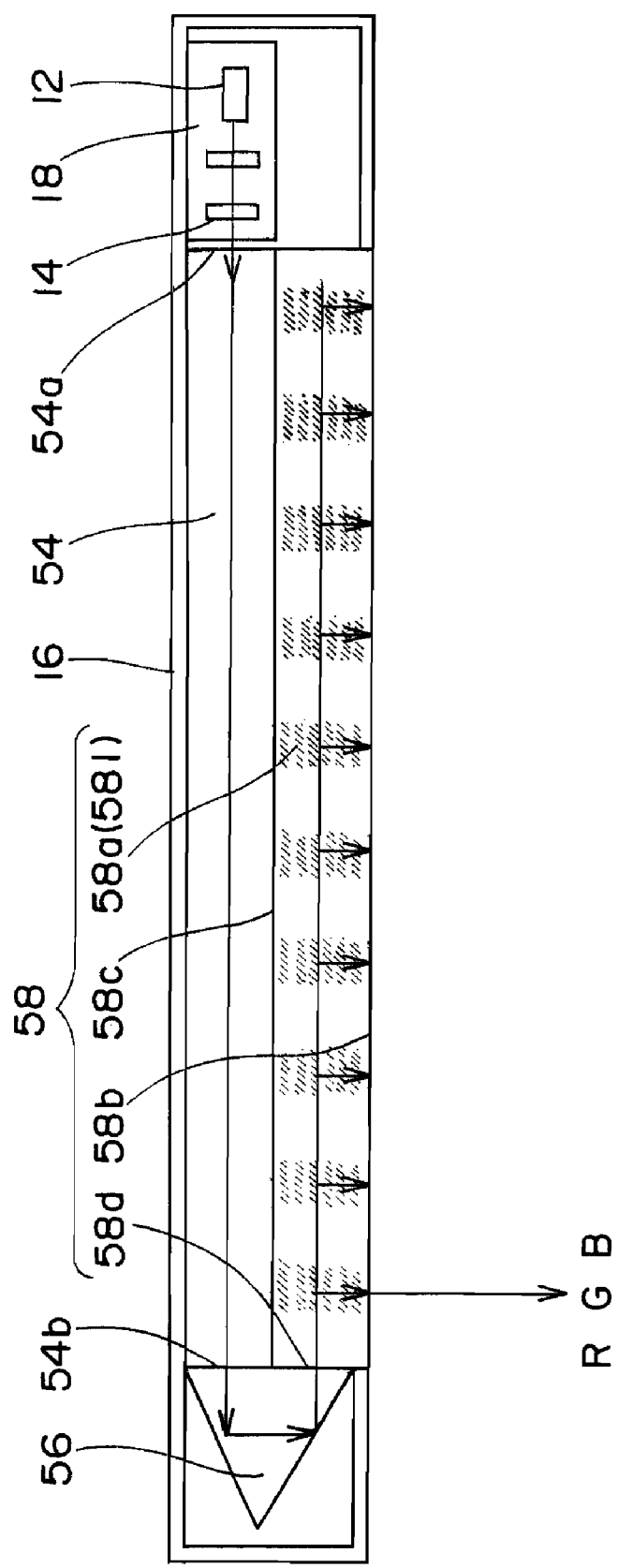

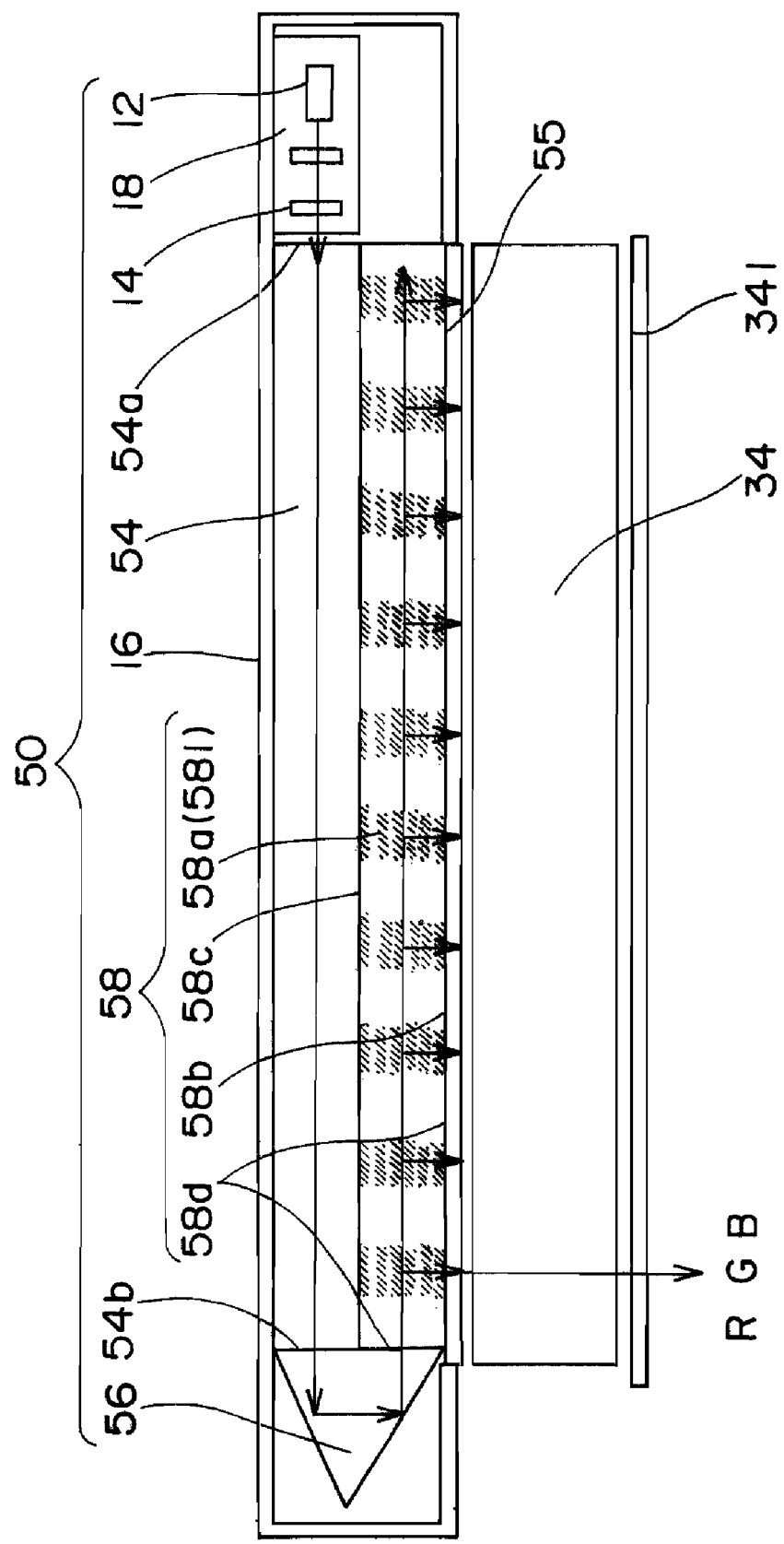

PLANAR LIGHTING AND LCD DEVICE WITH A LASER LIGHT SOURCE EMITTING A LINEARLY-POLARIZED LASER BEAM, OPTICAL MEMBER TO PARALLELIZE THE BEAM AND A PLATE-SHAPED LIGHT GUIDE FOR EMITTING PART OF THE BEAM

TECHNICAL FIELD

The present invention relates to a planar lighting device using a laser beam as a light source, and a liquid crystal display device using the planar lighting device.

BACKGROUND ART

Conventionally, a planar lighting device using a cold cathode fluorescent tube as a light source is widely used as a backlight illumination in a liquid crystal display device using a liquid crystal display panel. The cold cathode fluorescent tube used therein utilizes light emission of a phosphor (fluorescent material), and has a restriction in a displayable color reproduction range. Therefore, various examinations have been carried out for reproducing a further clear and natural tone. Above all, the planar lighting device for backlight using a light emitting diode (an LED element) of three colors such as red light (R-light), green light (G-light), and blue light (B-light) is focused. The light source using the three colors of R-light, G-light, and B-light or a multi-color LED element has a wider color reproduction range than that of the cold cathode fluorescent tube, thus making it possible to obtain a high image quality. Alternately, it is also possible to display an image by a field sequential method. Therefore, such developments are actively promoted.

In addition, one configuration has been illustrated, which suppresses a heat generation increasing as a drive current increases by using a semiconductor laser element as a light emitting element of at least one of the three color light emitting elements so as to reduce a fluctuation of the characteristics. The semiconductor laser element has a luminance higher than that of the LED element and is suitable for higher output. Note that this configuration example specifically shows that a red color semiconductor laser is used (see Patent Document 1, for example).

As Patent Document 1 describes in its example, when a laser is used as a light source, it is important to realize a uniform luminance over a large area. If there is a variation in luminance, it extremely deteriorates the image displayed thereon even when its color reproduction range gets wider. However, almost no configuration example that uses a laser light source as a backlight illumination exists. Patent Document 1 neither teaches nor indicates any strategy to realize the uniform luminance.

Meanwhile, the conventional liquid crystal display device has two polarizing plates. In general, the two polarizing plates are provided in front and back ends of a liquid crystal display panel so that the liquid crystal display panel may be sandwiched by the two polarizing plates. The two polarizing plates are arranged such that the two polarizing plates may be substantially parallel to one another, and a prescribed intersection angle may be formed by the polarization axes of the two polarizing plates. Here, the "intersection angle" is an angle formed by the polarization axes of the two polarizing plates when viewing the two polarizing plates disposed substantially parallel from a direction vertical to their major surfaces. Therefore, the conventional liquid crystal display device has a problem that 50% or more of natural light for illumination from the LED of the backlight lighting device or the cold cathode fluorescent lamp are lost. It significantly lowers the efficiency in its use of light. To overcome such a problem, for example, if the polarizing plate on the back side of the liquid crystal display panel in the liquid crystal display device is omitted, the light use efficiency can be drastically improved. However, for now, there has been no document released which discloses the liquid crystal display device using the planar lighting device as the backlight lighting device without a polarizing plate on the back side of the liquid crystal display panel to improve the light use efficiency.

Patent document 1: JP 2005-064163 A

DISCLOSURE OF INVENTION

Problem to be Solved by the Invention

Patent Document 1 discloses a configuration in which a red semiconductor laser is used as a light emitting element specifically. However, in Patent Document 1, there is absolutely no description about a specific approach to realize a planar lighting device using laser light sources of three colors, red light, green light, and blue light, which achieves a uniform luminance to the degree required for the use as the backlight lighting device of the liquid crystal display device.

As described above, in Patent Document 1, there is absolutely no description regarding a technique that enables the liquid crystal display device having the planar lighting device for the backlight illumination to omit the polarizing plate on the back side of the liquid crystal display panel. Hence, the low light use efficiency mentioned above imposes a restriction on power saving.

In order to solve the above-described problem, the present invention is provided. It is an object of the present invention to provide a planar lighting device using the laser light source as the light emitting element that has a wide color reproduction range and uniform luminance. It is also an object of the present invention to provide a liquid crystal display device using the planar lighting device according to the present invention as the backlight lighting device in which the polarizing plate on the back side of the liquid crystal display panel which is conventionally indispensable can be omitted.

Means for Solving Problem

In order to solve the above problem, according to one aspect of the present invention, a planar lighting device is provided. The planar lighting device includes: a laser light source which emits a linearly-polarized laser beam; an optical member which receives the laser beam, then parallelizes the laser beam, and emits the parallelized laser beam; and a first plate-shaped light guide which receives the parallelized laser beam from an end face portion and emits the laser beam from a first major surface, in which the first light guide includes an optical element which receives the linearly-polarized parallelized laser beam propagating through the first light guide and emits at least a part of the parallelized laser beam in a direction substantially vertical to the first major surface.

When thus configured, the planar lighting device can emit the incident parallelized laser beam from a first major surface (one of the major surfaces) with a planarly uniform luminance to achieve equal illumination with the linear polarization condition maintained.

In the one aspect of the present invention, it is preferable that the laser light source can emit red laser light, green laser light, and blue laser light at least.

Thus, it provides the planar lighting device which can emit the linearly-polarized laser beam of red color, green color, and blue color at least, and achieve a wide color reproduction range.

In the one aspect of the present invention, it is preferable that the optical element is a hologram layer. A plurality of the hologram layers are arranged intermittently at intervals of a specific pitch along a propagation direction of the parallelized laser beam propagating through the first light guide. The hologram layers each diffract at least a part of the parallelized laser beam and emit the beam in a direction substantially vertical to the first major surface. In this case, the hologram layer may be a phase modulation type volume hologram. Alternatively, the hologram layer may be a planar phase modulation type computer-generated hologram.

When thus configured, the hologram layer can diffract and emit at least a part of the linearly-polarized laser beam of a prescribed wavelength from one of the major surfaces with the polarization condition maintained.

In the one aspect of the present invention, it is preferable that the plurality of hologram layers each extends substantially linearly in a direction vertical to a propagation direction of the parallelized laser beam. The hologram layers extending substantially linearly are preferably disposed intermittently at intervals of a specific pitch along the propagation direction of the parallelized laser beam. The diffraction efficiencies of the hologram layers preferably increase monotonously from the end face portion along the propagation direction of the parallelized laser beam.

When thus configured, the diffraction efficiencies vary in the propagation direction of the laser beam so that the planar lighting device can emit the linearly-polarized laser beam with its luminance uniform over the entire surface of the one of the major surfaces.

In the one aspect of the present invention, the optical element may be a semi-transmissive mirror. A Plurality of the semi-transmissive mirrors is preferably disposed at intervals of a specific pitch along a propagation direction of the parallelized laser beam propagating through the first light guide so that each of the semi-transmissive mirrors may reflect at least a part of the parallelized laser beam and emit the reflected beam in a direction substantially vertical to the first major surface.

When thus configured, the parallelized laser beam is partially reflected at the semi-transmissive mirror with the polarization maintained so that the linearly-polarized laser beam can be emitted from the one of the major surfaces.

In the one aspect of the present invention, it is preferable that the plurality of the semi-transmissive mirrors each extends substantially linearly in a direction vertical to a propagation direction of the parallelized laser beam. The semi-transmissive mirrors extending substantially linearly are preferably disposed intermittently at intervals of a specific pitch along the propagation direction of the parallelized laser beam. The reflectances of the semi-transmissive mirrors preferably increase monotonously from the end face portion along the propagation direction of the parallelized laser beam.

When thus configured, the reflectances vary in the propagation direction of the laser beam so that the planar lighting device can emit the linearly-polarized laser beam with its luminance uniform over the entire surface of the one of the major surfaces.

In the one aspect of the present invention, it is preferable that the optical member includes an optical path conversion unit which converts the optical path of the laser beam and emits the laser beam. The optical path conversion unit preferably receives the laser beam, folds back the optical path of the laser beam, and makes the parallelized laser beam incident onto the end face portion.

When thus configured, the size of the entire body shape of the planar lighting device can be miniaturized. In addition, it is possible to make the parallel light directed toward a certain specific direction incident onto the optical element of the first light guide so that the hologram layer, the semi-transmissive mirror, or the like can be designed easily and the light intensity distribution in the surface can be further made uniform.

In the one aspect of the present invention, it is preferable that the planar lighting device further includes a second light guide (second light guide plate) which receives the laser beam and guides the laser beam to the optical path conversion unit. The second light guide is preferably disposed on the major surface of the first light guide, which is different from the first major surface, in parallel and in close contact with each other. At the same time, the laser light source and the optical path conversion unit are preferably disposed near the end face portion of the second light guide.

When thus configured, it is possible to fully transmit the laser beam generated by the laser light source through the second light guide to the optical path conversion unit without leakage of light. In addition, the laser beam is not blocked even if pieces of dirt adhere thereto. Hence the planar lighting device having excellent reliability can be realized.

In the one aspect of the present invention, it is preferable that, out of the linearly-polarized parallelized laser beam, the optical element emits only the parallelized laser beam of which polarization axis directs to a prescribed direction in a direction substantially vertical to the first major surface.

When thus configured, the planar lighting device can emit a linearly-polarized planar laser beam that has further excellent polarization degree in the direction to the one of the major surfaces.

According to another aspect of the present invention, a liquid crystal display device is provided. The liquid crystal display device includes: a liquid crystal display panel having a polarizing plate provided on the side of its display surface; a backlight lighting device which illuminates the liquid crystal display panel from the back side which is the opposite side of the display surface side. The backlight lighting device has: a laser light source which emits a linearly-polarized laser beam; an optical member which receives the laser beam, then parallelizes the laser beam, and emits the parallelized laser beam; and a first plate-shaped light guide which receives the parallelized laser beam from an end face portion and emits the laser beam from a first major surface, in which: the first light guide has an optical element to receive the linearly-polarized parallelized laser beam propagating through the first light guide and emits at least a part of the parallelized laser beam in a direction substantially vertical to the first major surface; the liquid crystal display panel is disposed such that a back side of the liquid crystal display panel may be in close contact with the first major surface of the first light guide; and the laser beam emitted from the first major surface is incident in the back side of the liquid crystal display panel with a polarization axis of the laser beam forming a prescribed intersection angle with respect to the polarization axis direction of the polarizing plate. In this case, it is preferable that the laser light source can emit red laser beam, green laser beam, and blue laser beam at least.

When thus configured, the backlight lighting device which emits planarly the linearly-polarized laser beam from the direction of the one of the major surfaces can illuminate the liquid crystal display panel. Hence, the polarizing plate on the back side of the liquid crystal display panel can be omitted so that the light use efficiency is significantly improved. Furthermore, a displayable color reproduction range can be enlarged since the laser light source provides good color purity with respect to the wavelength of the laser beam. Therefore, it makes the display device possible to show a full color display with a further clear and natural color tone. At the same time, low power consumption is also achieved for the high light emission efficiency of the laser light source.

In the another aspect of the present invention, it is preferable that the optical element is a hologram layer. A plurality of the hologram layers are disposed intermittently at intervals of a specific pitch along a propagation direction of the parallelized laser beam propagating through the first light guide. The hologram layers each diffract at least a part of the parallelized laser beam and emit the beam in a direction substantially vertical to the first major surface.

In the another aspect of the present invention, it is preferable that In this case, the hologram layer is a phase modulation type volume hologram. The phase modulation type volume holograms may be a three wavelengths multiple hologram by three wavelengths corresponding to red light, green light, and blue light at least. In addition, the phase modulation type volume hologram may include three kinds of single wavelength holograms which are disposed at intervals of a specific pitch and correspond to a red light wavelength, a green light wavelength, and a blue light wavelength, respectively.

In the another aspect of the present invention, it is preferable that the hologram layer may be a planar phase modulation type computer-generated hologram. In this case, the first light guide preferably includes a sub-light guide which corresponds to a wavelength of the laser beam emitted by the laser light source. The planar phase modulation type computer-generated hologram corresponding to a wavelength of the parallelized laser beam propagating through the sub-light guide is preferably formed in the sub-light guide.

When thus configured, the liquid crystal display panel is illuminated by the linearly-polarized laser beam of the prescribed emission wavelength from the one side of the major surfaces in which the polarization condition of the laser beam diffracted is maintained through the diffraction. Hence, the polarizing plate on the back side of the liquid crystal display panel can be omitted so that the light use efficiency is significantly improved. Therefore, it makes the display device possible to show high luminance and wide color reproduction range.

In the another aspect of the present invention, it is preferable that the plurality of hologram layers each extends substantially linearly in a direction vertical to a propagation direction of the parallelized laser beam. The hologram layers extending substantially linearly are preferably disposed intermittently at intervals of a specific pitch along the propagation direction of the parallelized laser beam. The diffraction efficiencies of the hologram layers preferably increase monotonously from the end face portion along the propagation direction of the parallelized laser beam.

When thus configured, the planar lighting device emits the linearly-polarized laser beam with its luminance uniform over the entire surface of the one of the major surfaces and illuminates the liquid crystal display panel so that the liquid crystal display device can show a planar uniform luminance.

In the another aspect of the present invention, the optical element may be a semi-transmissive mirror. Plurality of the semi-transmissive mirrors are preferably disposed at intervals of a specific pitch along a propagation direction of the parallelized laser beam propagating through the first light guide so that each of the semi-transmissive mirrors may reflect at least a part of the parallelized laser beam and emit the reflected beam in a direction substantially vertical to the first major surface.

When thus configured, the parallelized laser beam is partially reflected at the semi-transmissive mirror with the polarization maintained so that the linearly-polarized laser beam of a prescribed wavelength can be emitted from the one of the major surfaces. and the liquid crystal display panel can be illuminated. Hence, the polarizing plate on the back side of the liquid crystal display panel can be omitted so that the light use efficiency is significantly improved. Furthermore, it makes the display device possible to show high luminance and wide color reproduction range.

In the another aspect of the present invention, it is preferable that the plurality of the semi-transmissive mirrors each extends substantially linearly in a direction vertical to a propagation direction of the parallelized laser beam. The semi-transmissive mirrors extending substantially linearly are preferably disposed intermittently at intervals of a specific pitch along the propagation direction of the parallelized laser beam. The reflectances of the semi-transmissive mirrors preferably increase monotonously from the end face portion along the propagation direction of the parallelized laser beam.

When thus configured, the planar lighting device emits the linearly-polarized laser beam with its luminance uniform over the entire surface of the one of the major surfaces and illuminates the liquid crystal display panel so that the liquid crystal display device can show a planar uniform luminance.

In the another aspect of the present invention, it is preferable that the optical member of the backlight lighting device includes an optical path conversion unit which converts the optical path of the laser beam and emits the laser beam. The optical path conversion unit preferably receives the laser beam, folds back the optical path of the laser beam, and makes the parallelized laser beam incident onto the end face portion.

When thus configured, the size of the backlight lighting device can be miniaturized so that the size of the entire body of the liquid crystal display device can also be miniaturized. In addition, it is possible to make the laser beam incident onto one of end face portions of the first light guide plate as parallel light so that the hologram layer, the semi-transmissive mirror, or the like can be designed easily and the light intensity distribution in the surface can be further made uniform. Thus, the liquid crystal display device can show a planar further uniform luminance.

In the another aspect of the present invention, it is preferable that the backlight lighting device further includes a second light guide which receives the laser beam and guides the laser beam to the optical path conversion unit. The second light guide is preferably disposed on the major surface of the first light guide, which is different from the first major surface, in parallel and in close contact with each other. At the same time, the laser light source and the optical path conversion unit are preferably disposed near the end face portion of the second light guide.

When thus configured, it is possible to fully transmit the laser beam generated by the laser light source through the second light guide plate to the optical path conversion unit without leakage of light. In addition, the laser beam is not blocked since no dirt adheres thereto. Hence the liquid crystal display device of high quality can be realized.

In the another aspect of the present invention, it is preferable that the liquid crystal display panel includes an array of pixels. The pixels preferably include a red color pixel unit, a green color pixel unit, and a blue color pixel unit. The parallelized laser beam is preferably emitted from the first major surface in a state where the parallelized laser beam is separated into at least a red laser beam, a green laser beam, and a blue laser beam. The optical elements arranged in the first light guide preferably correspond to the array of pixels so that the red laser beam may enter the red color pixel unit, the green laser beam may enter the green color pixel unit, and the blue laser beam may enter the blue color pixel unit.

When thus configured, it is possible to emit red color light, green color light, and blue color light, respectively to the red color pixel unit, the green color pixel unit, and the blue color pixel unit constituting the array of pixels of the liquid crystal display panel. Hence, the color filters can also be omitted. Thanks to the removal of the color filters, further bright display can be achieved.

In the another aspect of the present invention, it is preferable that the backlight lighting device further includes a deflector sheet on the first major surface of the first light guide. The deflector sheet preferably deflects an advancing direction of the laser beam emitted from the first major surface. In this case, the deflector sheet includes at least one of a diffuser plate, a lens sheet, and a prism sheet.

When thus configured, the linearly-polarized laser beam is uniformly spread obliquely from the entire surface of the one major surface of the backlight lighting device. Therefore, the liquid crystal display device can show a uniform display with a wide viewing angle.

Effect of the Invention

The planar lighting device according to the present invention has a sufficient uniform luminance when used as the backlight lighting device of the liquid crystal display device. In addition, the liquid crystal display device of the present invention using the planar lighting device of the present invention as the backlight lighting device is capable of displaying an image with a color reproduction range wider than that of a conventional type liquid crystal display device using a conventional type planar lighting device as backlight illumination. Further, in the liquid crystal display device of the present invention, the polarizing plate on the back side of the liquid crystal display panel can be omitted according to the action of the planar lighting device of the present invention. Therefore, the light use efficiency can be improved, and further its power consumption can be reduced.

BRIEF DESCRIPTION OF DRAWINGS

FIG. 1B is a schematic sectional view along the line A-A of FIG. 1A.

FIG. 4A is a schematic sectional view of the structure of a modification of the planar lighting device according to the first embodiment.

FIG. 5B is a schematic sectional view along the line B-B of FIG. 5A.

FIG. 6B is a schematic sectional view along the line C-C of FIG. 6A.

FIG. 8 is a schematic sectional view of the structure of a modification of the planar lighting device according to the second embodiment.

FIG. 10B is a schematic sectional view along the line E-E of FIG. 10A.

FIG. 11B is a schematic sectional view along the line F-F of FIG. 11A.

Figure 1A:
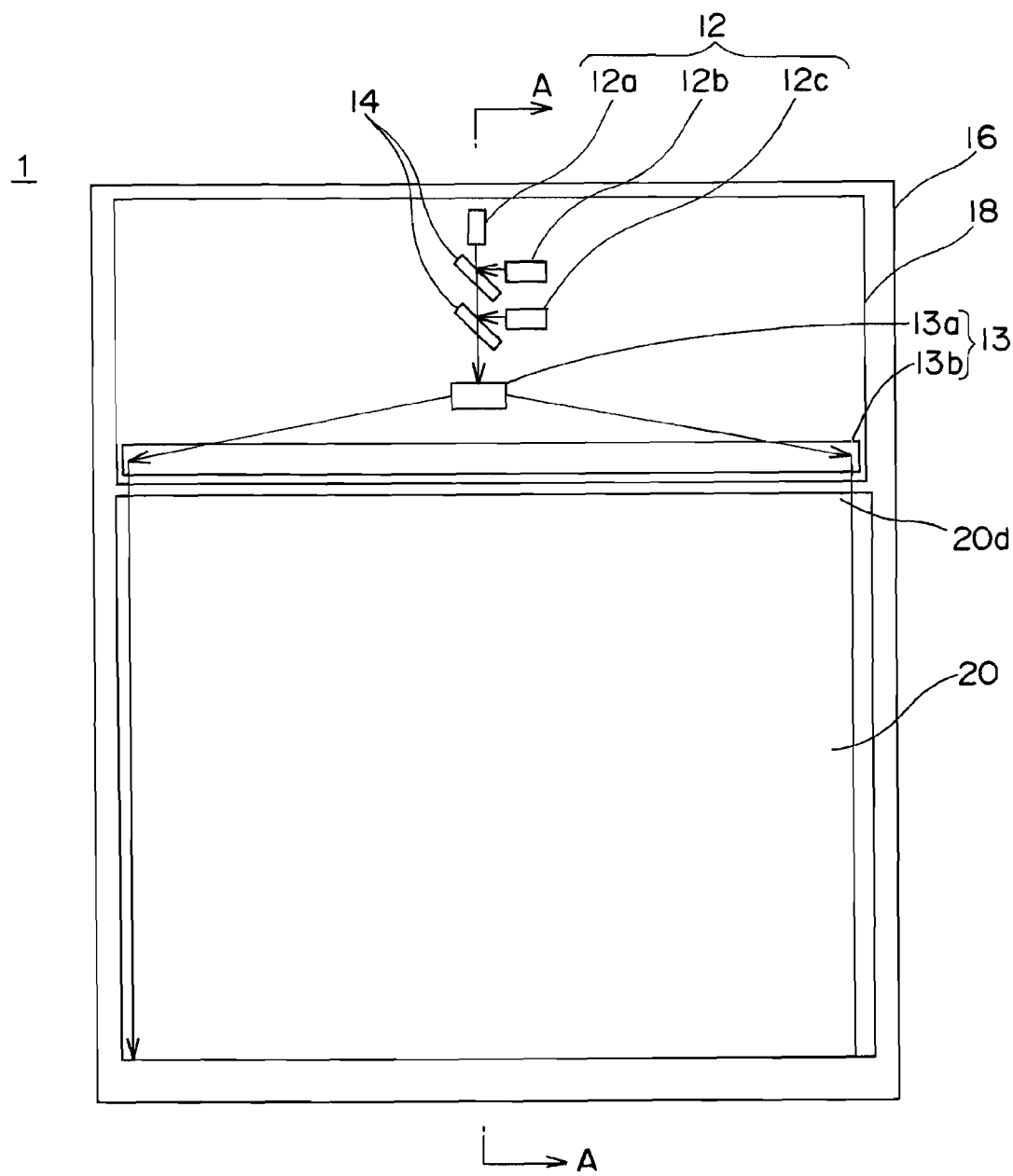
FIG. 1A is a schematic plan view of a configuration of a planar lighting device according to a first embodiment of the present invention.

EXPLANATIONS OF LETTERS OR NUMERALS 1, 2, 4, 5, 50, 70 Planar Lighting Device (Backlight Lighting Device)
3, 6, 60 Liquid crystal display device
12 Laser light source
12a R-light source (red color light source)
12b G-light source (green color light source)
12c B-light source (blue color light source)
13, 13a, 13b Optical member
14 Dichroic mirror
16 Casing
18 Housing part
20, 30, 40, 50, 58 First light guide plate
20a, 40a, 58a Optical element
20b, 30b, 40b, 50b, 58b Major surface
20c, 40c, 50c, 58c Another major surface
20d, 30d, 40d, 54a, 58d End face portion
25a, 25b, 25c, 45, 55 Deflector sheet 34 Liquid crystal display panel
52 Beam scanning unit
52a Reflection mirror
52b Angle adjustment mechanism
54 Second light guide plate
54b Other end face portion
56 Optical path conversion unit
251, 351, 581 Hologram layer
251a, 251b, 251c Phase modulation type volume hologram
301, 302, 302, 511, 512, 513 Sub-light guide plate
311 Groove
341 Polarizing plate
351a, 351b, 351c planar phase modulation type computer-generated hologram
401 Inclined plane
402 Dielectric multilayer film
403 Transparent resin
451, 551 Semi-transmissive mirror

BEST MODE FOR CARRYING OUT THE INVENTION

The present invention relates to a planar lighting device, which uses a laser light source as a light source, has a uniform luminance on a display surface of a large area, and has a wide color reproduction range. Thus, the present invention provides a liquid crystal display device using this planar lighting device.

Preferred embodiments of the present invention will be described hereunder, with reference to the drawings. Note that the same symbols and numerals are assigned to the same element, and description thereof is omitted in some cases. At the same time, the planar lighting device (backlight lighting device) is expanded and shown in these drawings to be easily understood, and therefore the scales and the like of the liquid crystal display panel and the planar lighting device are not accurately identically displayed.

First Embodiment

FIGS. 1A and 1B are diagrams of the planar lighting device according to a first embodiment of the present invention. FIG. 1A is a plan view of an outline of the structure and FIG. 1B is a schematic diagram of a section face along the line A-A of FIG. 1A. Note that in FIG. 1A, surfaces of a casing 16 and a housing part 18 are cutout respectively so that the internal structure be illustrated to be easily understood. In addition, in the present embodiment, as will be described later, an embodiment that uses a hologram layer as an optical element will be described.

As illustrated in FIG. 1A, the planar lighting device 1 of the first embodiment has a configuration as described below. The planar lighting device 1 has laser light sources 12 (12a, 12b, and 12c), and the laser light sources 12 have at least three light sources for emitting linearly-polarized light of three primary colors such as a red light (R-light) source 12a, a green light (G-light) source 12b, and a blue light (B-light) source 12c. A dichroic mirror 14 multiplexes the laser beams emitted from the laser light sources 12a, 12b, and 12c, and emits the light from an identical place. The laser beams emitted from the dichroic mirror 14 are expanded by an optical member 13a such as a cylindrical lens, and are made incident on an optical member 13b. In the present embodiment, the optical member 13 (13a and 13b) has a function of emitting the laser beams having been emitted from the dichroic mirror 14 as optically parallelized laser beams, and for example, is constituted of a lens group designed to have such a function. In the present embodiment, the optical member 13a is a lenticular lens whereby the laser beams incident on the optical member 13a are horizontally expanded in the lateral direction in the figure plane and are emitted. Then, the optical member 13b is a cylindrical Fresnel lens for receiving the laser beams emitted from the optical member 13a in a state of having undergone the aforementioned expanding operation, parallelizing the laser beams, and emitting the laser beams as parallelized laser beams. Thus, by constituting the optical member 13 using a combination of the lenticular lens and the cylindrical Fresnel lens, the optical member 13 can advantageously convert the laser beams incident thereon to the parallelized laser beams having almost uniform light intensity in one direction crossing the propagation direction. By a first light guide plate 20 (first light guide), the laser beams having emitted from the laser light source 12 and formed into a linearly polarized and parallelized lights are made incident from one end face portion 20d and are emitted from one major surface 20b (see FIG. 1B). An optical element 20a (see FIG. 1B) is disposed inside the first light guide plate 20, and the incident laser beams are at least partially diffracted or reflected by the optical element 20a and emitted in a direction substantially vertical to the one major surface 20b as the linearly polarized light. Note that the casing 16 is disposed on the side of another major surface 20c of the first light guide plate 20.

In addition, a transparent resin material having excellent optical characteristics is preferably used as the first light guide plate 20, and particularly acrylic resin or polyolefin resin with a small birefringence is preferably used.

In the present embodiment, the optical element 20a has the hologram layer. The optical element 20a will be described hereunder as a hologram layer 251. The hologram layers 251 are disposed at intervals of a specific pitch along the propagation direction of the laser beams incident and propagated from the one end face portion 20d, and by the hologram layers 251, at least a part of the laser beams is diffracted and emitted from the one major surface 29b.

By the hologram layers 251, at least a part of the laser beams of each color is diffracted at several places inside the surface of the first light guide plate 20 while maintaining its polarization condition, and is emitted in a direction vertical to the one major surface 20b, and the remaining light is transmitted. The transmitted laser beams are made incident on the next hologram layer 251 in the propagation direction. Note that the hologram layers 251 may be continuously formed in the first light guide plate 20 or may be formed discontinuously and intermittently.

Figure 2A:
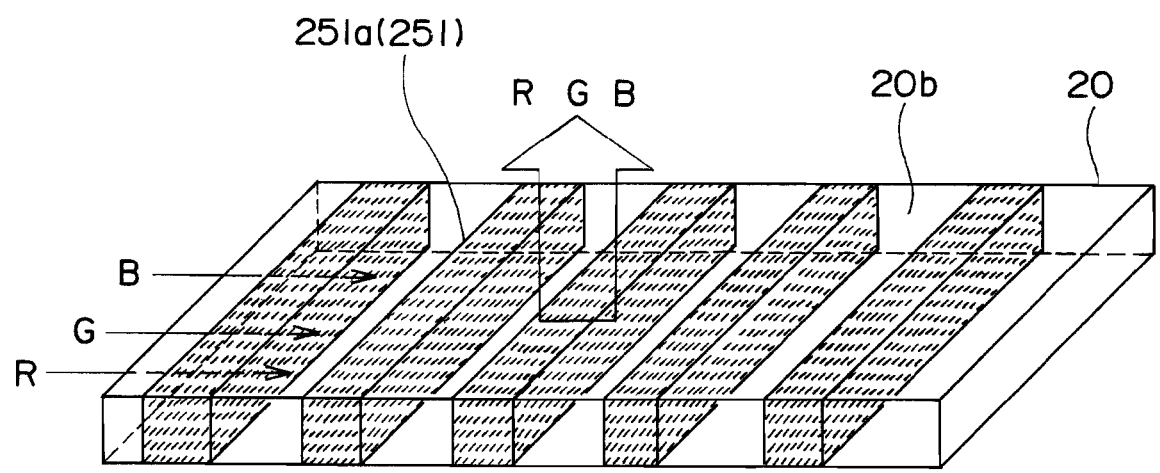
FIG. 2A is a schematic perspective view of the structure of a first light guide plate in which phase modulation type volume holograms are arranged as the hologram layers of the planar lighting device according to the first embodiment.

FIG. 2A is a schematic perspective view of a structure of the first light guide plate 20 in a case where the phase modulation type volume holograms are disposed as the hologram layers 251 of the planar lighting device 1 according to the embodiment. Such hologram layers 251 are formed by an interference exposure in which phase modulation type volume holograms 251a of a strip shape or a dot shape with a width of several μm to 20 μm are formed in a direction parallel to the major surface inside the surface of a photopolymer film having a thickness of about 100 μm. Note that the phase modulation type volume holograms 251a shown in FIG. 2A are the phase modulation type volume holograms formed by applying multiple exposure (three wavelengths multiple exposure) using at least red color, green color, and blue color light sources to the same part within the first light guide plate 20. By the phase modulation type volume holograms 251a thus constituted, at least a part of the laser beams of each color of red color, green color, and blue color that propagate through the holograms 251a is diffracted and emitted in a direction substantially vertical to the one major surface 20b, as the linearly-polarized laser beams of each colors.

Figure 2B:
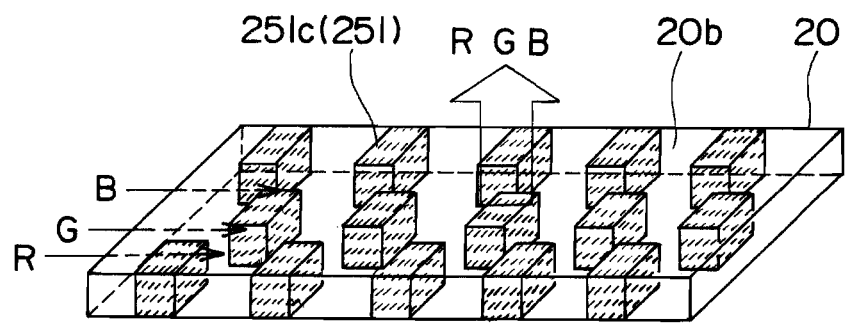
FIG. 2B is a schematic perspective view of the structure of a first light guide plate, in which the phase modulation type volume holograms are arranged as the hologram layers of the planar lighting device according to the first embodiment.

FIG. 2B is an example of an arrangement in which the phase modulation type volume hologram layers 251c are disposed inside the first light guide plate 20a in a dot shape. The phase modulation type volume holograms 251c includes holograms each of which has a width of several to 20 μm in the propagation direction of the light (the lateral direction in FIG. 2B) and is interspersed inside the first light guide plate as shown in the figure. The phase modulation type volume holograms 251c diffracts at least a part of the laser beams incident from the one end face portion 20d (see FIG. 1A) and emits the diffracted laser beams from the one major surface 20b (see FIG. 1A). The holograms interspersed each may be the size of which a side has a length of several to several hundreds μm. When diffraction efficiency is intended to be larger, the size of the block of the hologram has to be made larger. At the same time, the interval between blocks is preferably made shorter than or equal to 10 mm. When the interval is longer than 10 mm, intervals of the beams emitted from the one major surface 20b become too long to achieve the uniform in-surface distribution. It is preferable for the width of each hologram 251c in the propagation direction to be shorter than or equal to 20 μm so that the holograms do not have a strong selectivity. In a case of 20 μm or more, an allowable range of the angle of the incident light becomes smaller and therefore an excessive accuracy is required in the assembly step of the light guide plate.

The dot-shaped holograms 251c shown in FIG. 2B may be three wavelengths multiple holograms of RGB. Alternatively, gratings may be created so that the dots each diffract light of different wavelengths. The gratings of the holograms can be created by applying interference exposure to the photopolymer with using a mask and laser light having the wavelength to be used.

Figure 3:
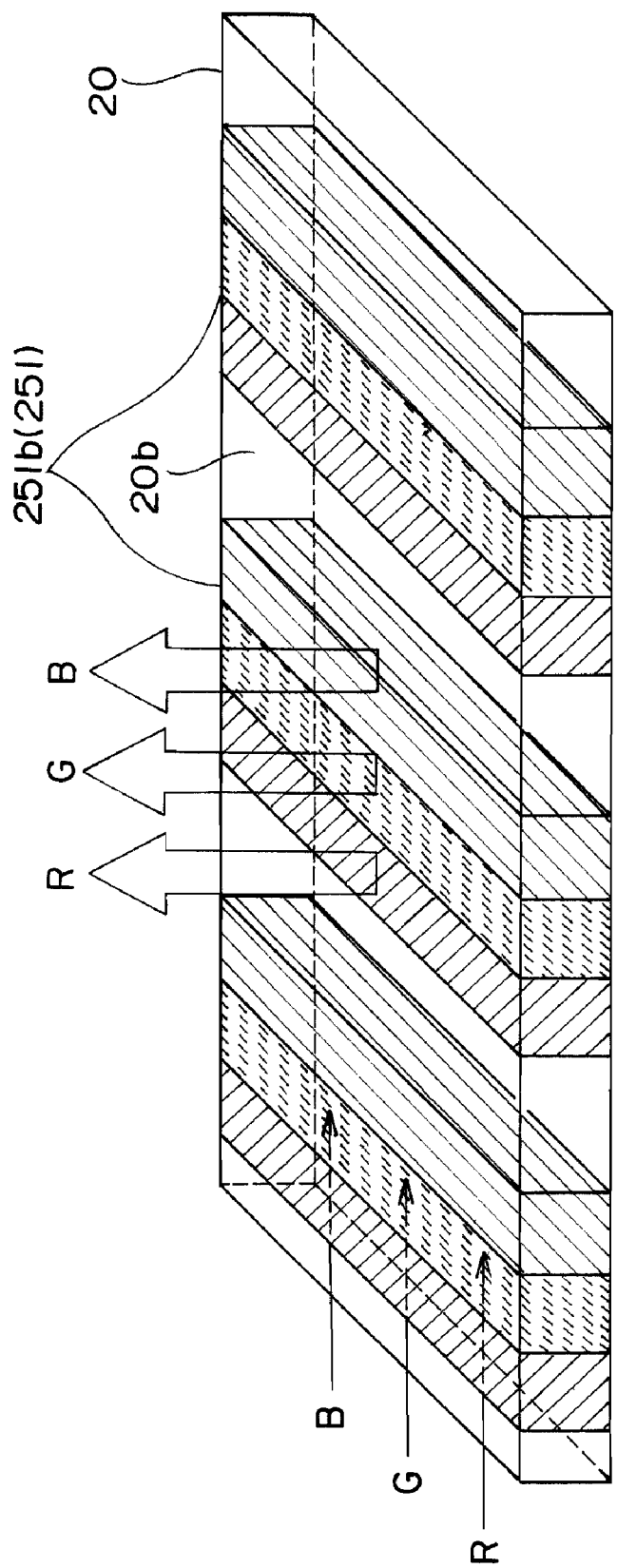
FIG. 3 is a schematic perspective view of another example of the structure of the first light guide plate, in which the phase modulation type volume holograms are arranged as the hologram layers of the planar lighting device according to the first embodiment.

FIG. 3 is a schematic perspective view of another structure of the first light guide plate 20 in which the phase modulation type volume holograms 251b of another configuration are disposed as the hologram layers 251 of the planar lighting device 1 according to the embodiment. As illustrated in FIG. 3, in this case, the phase modulation type volume holograms 251b (single wavelength holograms) for each wavelength of at least red color, green color, and blue color are formed at intervals of a specific pitch in the first light guide plate 20. By configuring the phase modulation type volume holograms 251b as the single wavelength holograms each corresponding to one of the colors, at least a part of the laser beam of each color propagating through the first light guide plate 20 is diffracted in the direction substantially vertical to the one major surface 20b by the phase modulation type volume holograms 251b which are formed for the wavelength, and is emitted from the one major surface 20b as the linearly-polarized laser beam of the color.

Note that when such hologram layers 251 (251a, 251b, 251c) are used, the diffraction efficiency of the hologram layers 251 may be varied at a specific ratio from the one end face 20d (see FIG. 1A and the like) of the first light guide plate 20 along the propagation direction of the laser beam. Preferably, the hologram layers 251 are created so that the diffraction efficiencies of the hologram layers 251 are increased at a specific ratio (a constant ratio or a variable ratio whereby the ratio varies along the propagation direction of the laser beams) from the one end face portion 20d (the end face portion of the side in which the laser beam made incident) along the propagation direction of the laser beam. Preferably, the diffraction efficiencies increases monotonously from the side of the end face 20d along the propagation direction of the laser beam. By thus the hologram layers 251 created, attenuation in the intensity of the laser beam is compensated so that it may be possible to uniformize the intensity of the linearly-polarized laser beams emitted in a direction substantially vertical to the one major surface 20b over one major surface 20b and realize a uniform luminance.

FIG. 4A is a sectional view of the structure of a planar lighting device 2 of a modification of the present embodiment. In this modified example of the planar lighting device 2, it has a hologram layer 351 as the optical element. The hologram layer 351 has the structure in which planar phase modulation type computer-generated holograms (CGH) 351a, 351b, and 351c are disposed. That is, a first light guide plate 30 includes sub-light guide plates 301, 302, and 303 of the number corresponding to the number of the colors of the laser light source 12, that is, corresponding number of the sources of R-light source 12a, the G-light source 12b, and the B-light source 12c. In the sub-light guide plates 301, 302, and 303, planar phase modulation type computer-generated holograms 351a, 351b, and 351c are disposed in the sub-light guide plates 301, 302, and 303, respectively. These planar phase modulation type computer-generated holograms 351a, 351b, and 351c can be manufactured by ejection molding onto the surface of the sub-light guide plates 301, 302, and 303 in which phase modulating patterns obtained with a computer are formed as grooves 311. Then, the laser beams of each color is made incident on the one end face portion 30d of the sub-light plates 301, 302, and 303, respectively as shown in FIG. 4A.

The planar phase modulation type computer-generated holograms 351a, 351b, and 351c thus configured make the parallelized laser beams of each color partially diffracted in a right angle direction at the groove 311. The diffracted linearly-polarized laser beams are emitted from the side of the one major surface 30b. Note that, in these planar phase modulation type computer-generated holograms 351a, 351b, and 351c, it is possible to vary the diffraction efficiencies of the hologram layers 351 (351a, 351b, and 351c) by changing heights "h" of the grooves 311 (see FIG. 4B) from the side of an incident surface of the first light guide plate 30 (the side of the one end face portion 30d) along the propagation direction of the laser beams at a prescribed ratio. Particularly, it is preferable to form the hologram layers 351 so that the diffraction efficiencies of the hologram layers 351 are gradually getting higher along the propagation direction of the laser beams. Preferably, the diffraction efficiencies vary monotonously from the side of the incident surface along the propagation direction of the laser beams. By thus the hologram layers 351 configured, the attenuation of the intensity of the laser beams can be compensated, and the intensity of the linearly-polarized laser beams emitted in a direction substantially vertical to the one major surface 30b can be uniformized over the one major surface 30b, thus making it possible to realize a uniform luminance.

Figure 4B:
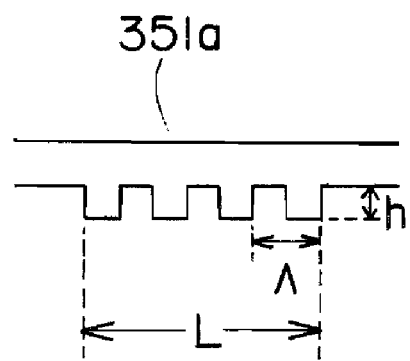
FIG. 4B is a partially expanded view of a planar phase modulation type computer-generated hologram.

FIG. 4B is a partially expanded view of the planar phase modulation type computer-generated hologram 351a, which is an example of the planar phase modulation type computer-generated hologram. The diffraction efficiency of the hologram can be determined by the height "h" of a convexo-concave shape formed in a groove shape (groove 311) and a length "L" in which the convexo-concave shapes are repeated. Since the diffraction efficiency is proportional to the second power of "h" or the first power of "L," preferably "h" is set to be larger and/or "L" is set to be longer when the diffraction efficiency is desired to be increased. In addition, the diffraction direction of the laser beam is determined by a convexo-concave period Λ of the grooves 311 and the wavelength of the laser beam. In the present invention, the convexo-concave period Λ may be a length where the diffracted light can be emitted in a direction substantially vertical to the major surface 30b.

Figure 4C:
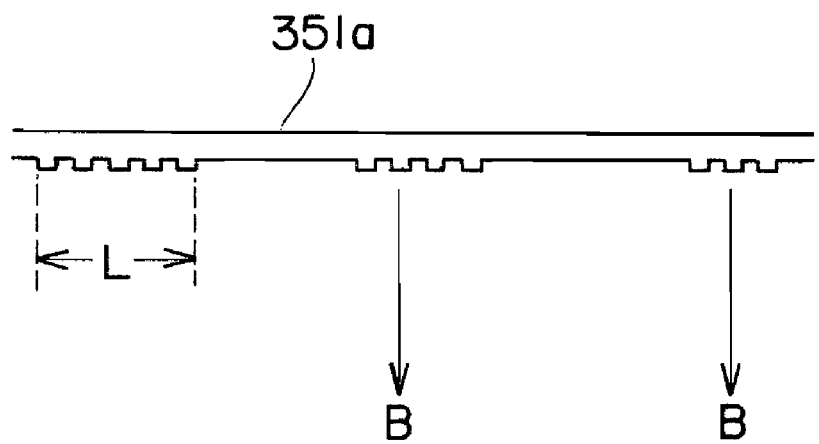
FIG. 4C is a schematic partial sectional view of the planar phase modulation type computer-generated hologram with concave/convex patterns intermittently and repeatedly formed.

FIG. 4C is an example of the planar phase modulation type computer-generated holograms 351a in which the convexo-concave shape is repeatedly and intermittently formed. Desired light quantity is emitted from the major surface of each part. The diffraction efficiency is controlled by the repetition length L.

As illustrated in FIG. 4C, by localizing a portion where the repetition of the convexo-concave shape is formed, it is possible to provide the portion where the intensity of the diffracted laser beam emitted from the one major surface is particularly strong and the portion where the intensity of such laser beams is adversely particularly weak. If the planar phase modulation type computer-generated hologram thus designed is used in the planar lighting device 2 illustrated in FIG. 4A, the laser beams can be emitted from the one major surface 30b with the laser beam of each color of R, G, and B separated.

Note that if the planar phase modulation type computer-generated holograms 351a, 351b, and 351c generate first-order light, a reflection layer (not shown) may be disposed on the major surface of the opposite side of the one major surface 30b so that the first-order light can be reflected and emitted from the one major surface 30b. In addition, the sub-light guide plates 301, 302, and 303 may be bonded by a transparent resin with a lower refraction index than those of these sub-light guide plates 301, 302, and 303. Thus, the integrally formed first light guide plate 30 can be configured without an optical problem.

Thus, the planar lighting device 2 is provided, in which linearly-polarized laser beam is planarly emitted from the one major surface 30b with a uniform luminance. In the planar lighting device 2, laser beams are parallelized and then made incident on the first light guide plate 30, and the optical elements, namely, the planar phase modulation type computer-composted holograms 351a, 351b, and 351c emits the laser beams partially in a direction vertical to the propagation direction with their polarization condition maintained.

Thus, the planar lighting device 2 is obtained, which uses the laser light source and provides a uniform luminance and a wide color reproduction range without the use of the polarizing plate on the back side of the liquid crystal display panel.

In addition, in the planar lighting device 1 and in its modification, the planar lighting device 2, the optical elements disposed in the first light guide plates 20 and 30 may diffract only the linearly-polarized laser beam that has a polarization axis directed to a prescribed direction from among the laser beams propagating within the first light guide plates 20 and 30 and emit the diffracted beam in a direction substantially vertical to the one major surfaces 20b and 30b. Thus, the degree of polarization of the laser beams emitted substantially vertically to the one major surface is further improved and it is possible to obtain the planar lighting devices 1 and 2 capable of planarly emitting the laser beams having excellent linearly-polarized property.

In the present embodiment, the holograms 251 and 351 described above are preferably phase modulation holograms. However, in the present embodiment, an amplitude modulation hologram can also be used. Note that the first light guide plate 20 may be a hollow light guide. In this case, the first light guide plate 20 may have a plurality of hologram elements (such as surface-relief holograms), which are provided along the propagation direction of the parallelized laser beam, for diffracting a parallelized laser beam incident from the one end face portion 20d in a direction substantially vertical to the one major surface 20b.

Figure 5A:
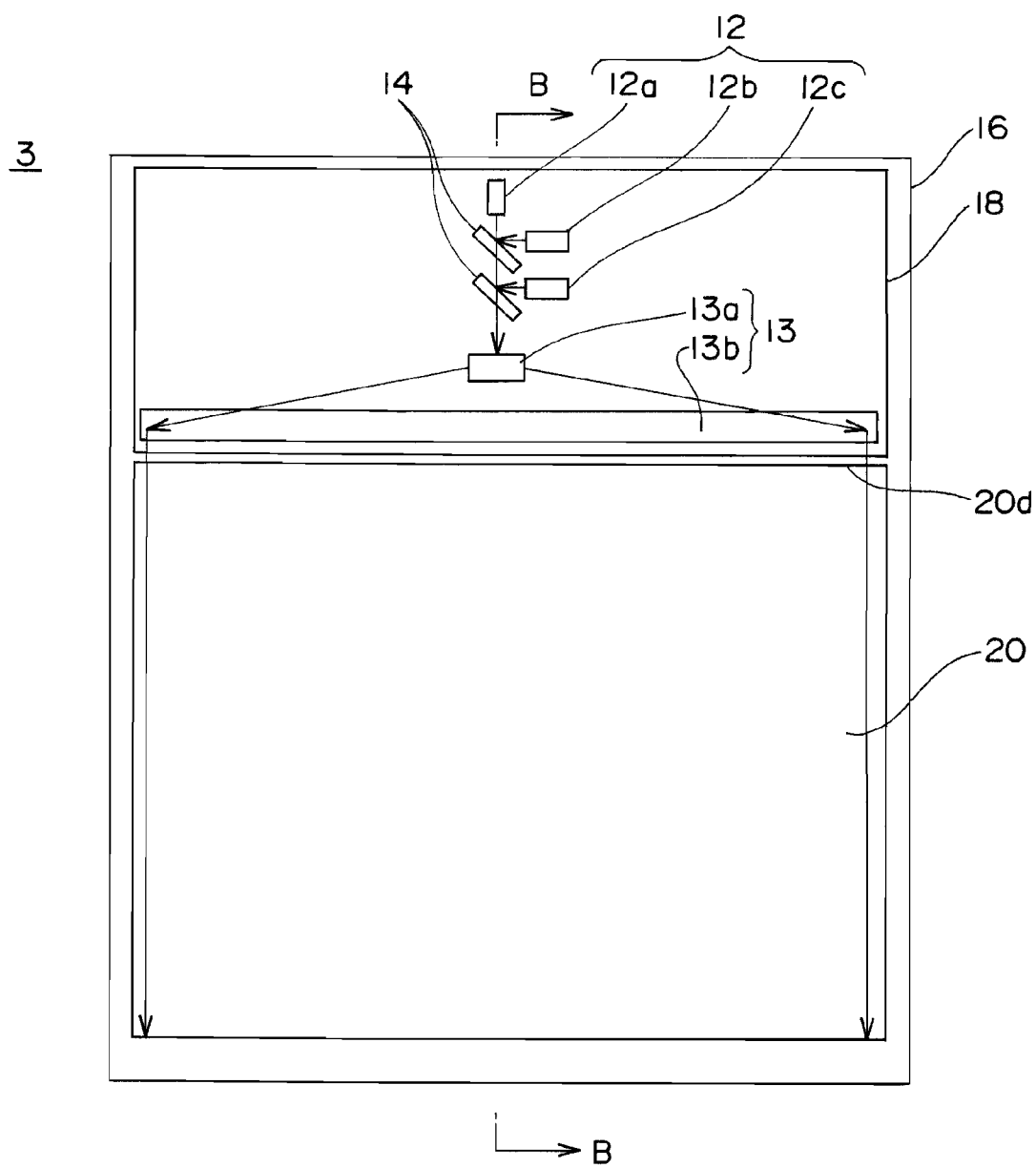
FIG. 5A is a schematic plan view of a configuration of a liquid crystal display device using the planar lighting device of the first embodiment as a backlight lighting device.

FIGS. 5A and 5B are views illustrating the configuration of a liquid crystal display device 3 using the planar lighting device 1 according to the present embodiment as a backlight lighting device. FIG. 5A is a plan view schematically illustrating the structure of FIG. 5A and FIG. 5B is a schematic sectional view along the line B-B of FIG. 5A. Note that, in this illustration of the liquid crystal display device, surfaces of the casing 16 and the housing part 18 are respectively cutout so that the internal structure is easily understood.

The liquid crystal display device 3 of the present embodiment includes a liquid crystal display panel 34 as well as the planar lighting device 1 according to the present embodiment as the backlight lighting device 1. The liquid crystal display panel 34 has a polarizing plate 341 only on the side of a display surface, namely, only on the viewer side.

The planar lighting device 1 used as the backlight lighting device includes the laser light source 12 and a first plate-shaped light guide plate 20 which receives a linearly-polarized and substantially polarized laser beam emitted by the laser light source 12 from the one end face portion 20d and emits the received beam planarly from the one major surface 20b. The laser beam incident in the one end face portion 20d in a state of linearly-polarized and substantially parallelized is diffracted by a optical element 20a disposed inside the first light guide plate 20 and is emitted in a direction vertical to the one major surface 20b in the state of linearly-polarized. The one major surface 20b of the first light guide plate 20 of the planar lighting device 1, the deflector sheet 25, and the liquid crystal display panel 34 are disposed in almost closely contact with one another. In addition, the polarization axis of the linearly-polarized laser beam emitted from the one major surface 20b and the polarization axis of the polarizing plate 341 of the liquid crystal display panel 34 form a specific intersection angle.

As described above, the laser light source 12 of the planar lighting device 1 has a light source which emits red color, green color, and blue color at least. In addition, in the liquid crystal display device 3 of the present embodiment, a deflector sheet 25a is provided on the one major surface 20b of the first light guide plate 20 for deflecting an advancing direction of the laser beam and expanding a viewing angle of a liquid crystal display screen. As the deflector sheet 25a, a diffuser plate composed of, for example, acrylic resin or polyolefin resin materials, a lens sheet, or a prism sheet can be used. Thus, the linearly-polarized laser beam can also be uniformly spread from an entire surface of the one major surface 20b in an oblique direction. Therefore, the liquid crystal display device 3 can display an image with a wide viewing angle and a uniform luminance.

Preferably, the liquid crystal display device of the present invention includes, in the side of the major surface of the light guide plate from which the laser beam is emitted, deflector sheets 25a, 25b, and/or 25c for deflecting the advancing direction of the laser beam. By the deflector sheets 25a, 25b, and/or 25c, the laser beam emitted in a direction substantially vertical to the major surface can be directed to directions other than the substantially vertical direction. Hence, the liquid crystal display device can provide a brightly displayed image to any viewer viewing from a variety of angles. Particularly, the acrylic resin or polyolefin resin materials with low double refraction are preferably used as the deflector sheets 25a, 25b, and 25c. By using such materials, the advancing angle and the intensity distribution of the beam can be controlled while maintaining the linearly-polarized property of the laser beam.

In addition, the diffusion film, the lens sheet, and the prism sheet are preferably used as the deflector sheets 25a, 25b, and 25c for enlarging a diffusion angle of the laser beam. The lens sheet and the prism sheet are composed of a pattern in which lenses or prisms are repeatedly formed, so that the laser beam can be diffused. The diffusion film diffuses the laser beam by means of a convexo-concave shape formed on its surface or a diffusing agent mixed therein. The viewing angle of the liquid crystal display device can be widened by using the deflector sheets 25a, 25b, or 25c, which provides the beam with a diffusion angle. In the present invention, the laser beam is diffused after the emission of the beam in the major surface direction so that the assurance of the viewing angle and the assurance of the linear polarization property are both satisfied.

Particularly, in the present invention, preferably the deflector sheets 25b, and/or 25c, which provide the diffusion angle to the laser beam, is disposed also on the viewer side of the liquid crystal display panel 34. The cooperation with the deflector sheet 25a on the major surface of the light guide plate can provide further wider viewing angle. Even in the case where the use of a single deflector sheet 25a to ensure a desired viewing angle results in a beam loss due to an excessive expansion before the incidence of the beam into the liquid crystal display panel 34, the beam loss can be suppressed to minimum and, simultaneously, the desired viewing angle and frontal luminance can be set by sharing the expansion at ahead and behind the liquid crystal display panel 34 with the use of the deflector sheet 25a, and 25b, and/or 25c.

In addition, it is preferable that the deflector sheets 25b and/or 25c on the viewer side of the liquid crystal display panel 34 may be disposed between the liquid crystal display panel 34 and the emission side polarizing plate 341 (which corresponds to the deflector sheet 25b in the figure). The deflector sheet diffuses and reflects illumination light from the viewer side and deteriorates a contrast in a bright place. However, by disposing the deflector sheet 25b on the back side of the polarizing plate 341 viewing from the viewer, the polarizing plate blocks the diffusion of the illumination light, and the deterioration of the contrast in a bright place can be suppressed.

In the liquid crystal display device 3 of FIGS. 5A and 5B, the planar lighting device 1 using the phase modulation type volume holograms 251a as the hologram layer 251 of the optical element 20a of FIGS. 1A and 1B is shown as an example. Namely, the hologram layer 251 is has the structure which is obtained by arranging the phase modulation type volume holograms 251a at intervals of a specific pitch, which are formed by multiple exposure (three wavelengths multiple exposure) using at least red color, green color, and blue color light sources at the same portion of the first light guide plate 20 shown in FIG. 2.

The intersection angle formed by the direction of the polarization axis of the laser beam emitted from the one major surface 20b and the direction of the polarization axis of the polarizing plate 341 on the side of the display surface of the liquid crystal display panel 34 may be set at 0 degree or 90 degrees in the case of a twist nematic type liquid crystal display panel and may be set at 0 degree in the case of a homeotropic type liquid crystal display panel. Thus, the polarizing plate (polarizer) can be omitted on the back side of the liquid crystal display panel 34.

The liquid crystal display panel 34 may be a transmissive type or semi-transmissive type. The panel 34 may be a thin film transistor (TFT) active matrix type liquid crystal display panel, for example. The panel 34 includes a number of pixels in its display region. The pixel is constituted of a red color pixel unit, a green color pixel unit, and a blue color pixel unit for one pixel unit and the pixels are is driven by the thin film transistor (TFT). Then, a liquid crystal layer is provided and oriented in a prescribed direction between two glass substrates. In addition, the TFT for driving this liquid crystal layer is formed on one of the glass substrates, although they are not shown. Regarding this liquid crystal display panel 34, a conventionally used one can be used excluding a point that the polarizing plate on the back side of the panel can be omitted, and therefore further explanation is omitted.

In the liquid crystal display device 3 of the present embodiment, the liquid crystal display panel 34 is illuminated from its back side by the linearly-polarized laser beam from the planar lighting device 1 used as the backlight lighting device, which uses the laser light source and diffracts and emits the laser beam in the direction substantially vertical to the one major surface 20b by means of the phase modulation type volume hologram layer 251a.

The linearly-polarized laser beam incident from the back side of the liquid crystal display panel is changed its optical rotation and polarization condition due to a change of refringent anisotropy induced by the change of a liquid crystal molecule orientation in the operating liquid crystal layer, and then is subjected to optical intensity modulation by the polarization control of the display surface side polarizing plate 341 (analyzer) arranged at the display surface side, namely, at the viewer side. Then, the laser beam subjected to the optical intensity modulation emerges on the display surface side so the high quality image is displayed. The same acts with respect to the laser beam of each color. Therefore, a full color display can be realized. Thus, the polarizing plate on the back side of the liquid crystal display panel 34 is omitted, thereby making it possible to improve the light use efficiency of about 50% compared to a conventional liquid crystal display device having the polarizing plate on its back side, and the liquid crystal display device 3 of high luminance can be realized.

In addition, it is possible to obtain emission wavelengths with extremely excellent color purity from the R-light source 12a, the G-light source 12b, and the B-light source 12c which are included in the laser light source 12. Therefore, the color reproduction range can be largely expanded. As a result, the image display of further high image quality can be obtained compared to a system of using a conventional fluorescent display tube or an LED light source. In addition, low power consumption is also possible, because the laser light source has a more excellent emission efficiency compared to the LED light source.

In addition, the planar lighting device 1 may be used as the backlight lighting device, wherein the hologram layers 251 are used as the optical elements 20a of the first light guide plate 20, and as illustrated in FIG. 3, the hologram layers 251 have the phase modulation type volume holograms 251b arranged at intervals of a specific pitch. Alternatively, the planar lighting device 2 may be used as the backlight lighting device, wherein the sub-light guide plates 301, 302, and 303, having the planar phase modulation type computer-generated holograms 351a, 351b, and 351c formed therein, are integrally formed.

In addition, as described above, the backlight lighting device illuminates the back side of the liquid crystal display panel with the laser beams of each color emitted from the one major surface direction, while maintaining the polarization state. However, the present invention is not limited thereto. For example, the hologram layers 251 used as the optical elements 20a provided in the first light guide plate 20 may be arranged at a position corresponding to the array of pixels of the liquid crystal display panel 34, and, from the one major surface 20b, the laser beams separated into at least red color, green color, and blue color may be made incident in the red color pixel unit, the green color pixel unit, and the blue color pixel unit constituting the array of pixels of the liquid crystal display panel 34, respectively. Thus, the red color pixel unit, the green color pixel unit, and the blue color pixel unit constituting the array of pixels of the liquid crystal display panel 34 can be individually illuminated with the laser beams separated into red color, green color, and blue color respectively, thus making it possible to omit color filters. By removing the color filters, further brighter display can be obtained.

Second Embodiment

Figure 6A:
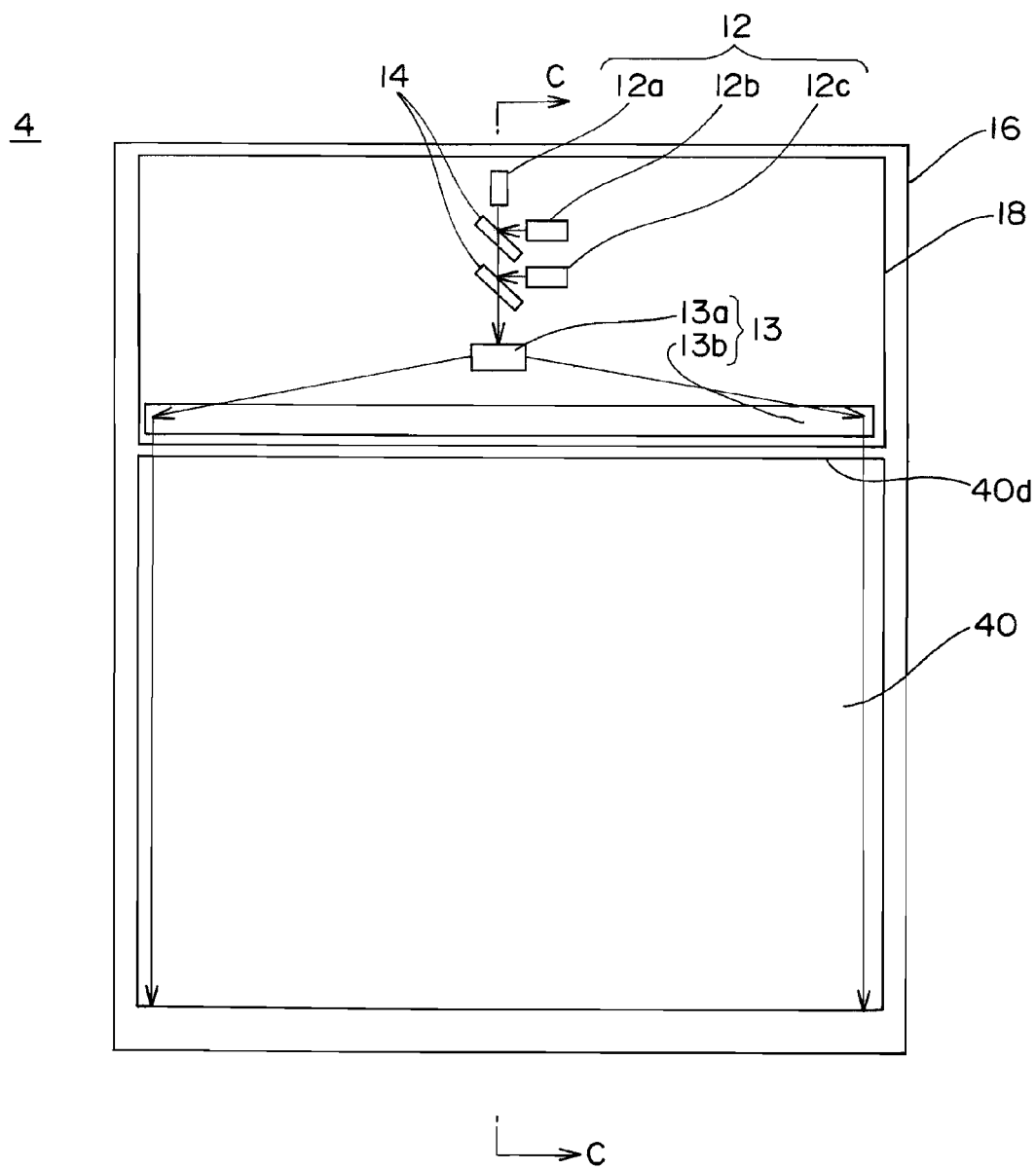
FIG. 6A is a schematic plan view of the configuration of a planar lighting device according to a second embodiment of the present invention.

FIG. 6A and FIG. 6B are views illustrating a planar lighting device 4 according to a second embodiment of the present invention. FIG. 6A is a plan view illustrating an outline of the configuration, and FIG. 6B is a schematic sectional view along the line C-C of FIG. 6A. Even in a case of illustrating this planar lighting device 4, the surfaces of a casing 16 and a housing part 18 are respectively cutout, thus making it easy to understand the internal configuration. The planar lighting device 4 of the present embodiment is different from the planar lighting device 1 of the first embodiment in the point that optical elements 40a of a first light guide plate 40 are semi-transmissive mirrors 451. The semi-transmissive mirrors 451 are arranged at intervals of a specific pitch along the propagation direction of the laser beam propagating through the first light guide plate 40, and at least a part of the laser beam is reflected by the semi-transmissive mirror, which is then propagates in a direction substantially vertical to the one major surface 40b and is emitted from the one major surface 40b. Note that the casing 16 is disposed on the side of another major surface 40c of the first light guide plate 40.

As illustrated in FIG. 6B, the planar lighting device 4 of the present embodiment uses the semi-transmissive mirrors 451 as the optical elements 40a provided in the first light guide plate 40. The optical elements 40a will be described as the semi-transmissive mirrors 451 hereunder.

The laser beams are made incident from the one end face portion 40d of the first light guide plate 40 as parallel light. Here, the semi-transmissive mirrors 451 extend in the direction vertical to the propagation direction of the laser beams, and are arranged side by side at intervals of a specific pitch along the propagation direction. By the semi-transmissive mirrors 451, at each part in the surface of the first light guide plate 40, at least a part of the linearly-polarized laser beams is reflected in the direction substantially vertical to the one major surface 40b, and the remaining linearly-polarized laser beams is transmitted therethrough toward the next semi-transmissive mirrors 451 along the propagation direction. Note that when light leakage is occurred, a reflection layer (not shown) may be disposed on the side of the another major surface 40c of the first light guide plate 40.

Figure 7A:
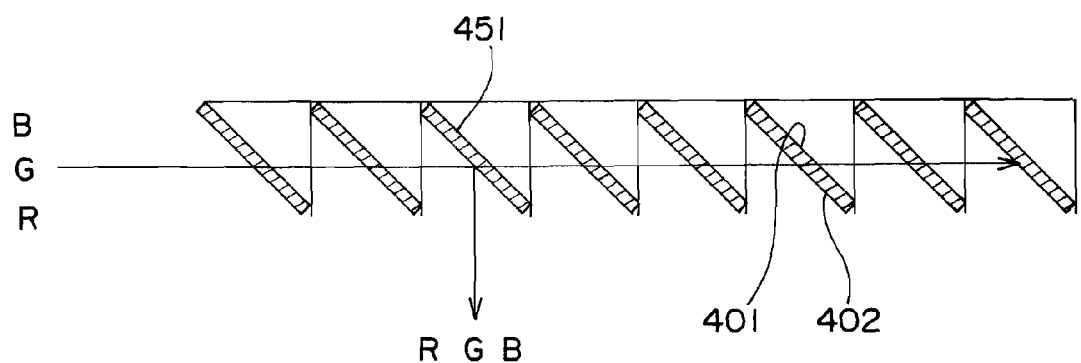
FIG. 7A is a schematic sectional view of the structure of the first light guide plate of the planar lighting device according to the second embodiment with semi-transmissive mirrors arranged therein.
Figure 7B:
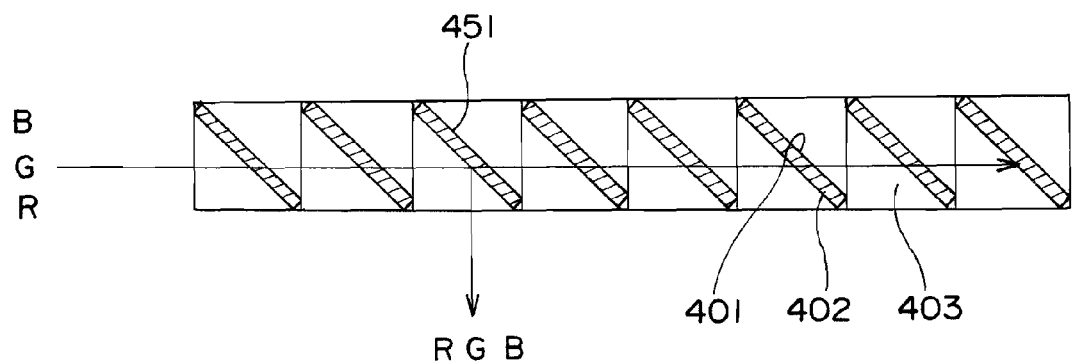
FIG. 7B is a schematic sectional view of the structure of the first light guide plate of the planar lighting device according to the second embodiment with semi-transmissive mirrors arranged therein.

FIG. 7A and FIG. 7B are schematic sectional views illustrating the structure of the semi-transmissive mirrors 451 provided in the first light guide plate 40 of the planar lighting device 4 of the present embodiment. First, as illustrated in FIG. 7A, the semi-transmissive mirrors 451 of the first light guide plate 40 may be formed by laminating a dielectric multiple layer film 402 on the surface of a strip-shaped Inclined plane 401 which is formed, for example, on a transparent resin substrate at intervals of a specific pitch. Note that, preferably, the dielectric multiple layer films 402 are laminated with its refractive index and film thickness varied.

Alternatively, as illustrated in FIG. 7B, after the dielectric multiple layer film 402 is laminated on the surface of the strip-shaped Inclined plane 401 formed at intervals of a specific pitch, the Inclined plane 401 may be embedded with the transparent resin 403. With this structure, the linearly-polarized laser beams of red color, green color, and blue color can be emitted from the one major surface 40b by the semi-transmissive mirrors 451.

In addition, the semi-transmissive mirrors 451 are linearly extended substantially vertically to the propagation direction of the laser beam, and are arranged side by side in a array shape at intervals of a specific pitch along the propagation direction. The reflectance of each semi-transmissive mirror 451 is changed step by step from the side of the incident surface of the first light guide plate 40 along the propagation direction of the laser beam. The reflectance is preferably varied monotonously from the side of the incident surface along the propagation direction. Thus, it is possible to obtain the planar lighting device 4 that emits the linearly-polarized laser beam with a uniform luminance over an entire surface of the one major surface 40b.

FIG. 8 is a schematic sectional view illustrating the configuration of a planar lighting device 5 of the modification of the present embodiment. As illustrated in FIG. 8, in the planar lighting device 5 of this modified example, a first light guide plate 50 includes sub-light guide plates 511, 512, and 513 arranged so as to correspond to the light source of each color of the laser light source 12. These sub-light guide plates 511, 512, and 513 include semi-transmissive mirrors 551. These sub-light guide plates 511, 512, and 513 have the dielectric multiple layer film laminated on the surface of the Inclined plane formed at intervals of a specific pitch respectively, and are provided with semi-transmissive mirrors 551 formed by filling the Inclined plane with transparent resin. That is, the structure of the sub-light guide plates 511, 512, and 513 are basically the same as those of the light guide plates illustrated in FIG. 7B. Thus, at least a part of the laser beam of red color, green color, and blue color is reflected by each semi-transmissive mirror 551 of each sub-light guide plate 511, 512, 513, and is emitted from the one major surface 50b. Note that the casing 16 is disposed on the side of the another major surface 50c.

With this structure, it is possible to obtain the planar lighting device 5 capable of planarly emitting the linearly-polarized laser beam from the one major surface 50b, by using the laser light source as the light source. In addition, the liquid crystal display device using the planar lighting device 5 as the backlight lighting device, uses the laser light source as the light source, and therefore has a wide color reproduction range and is capable of omitting the polarizing plate on the back side of the liquid crystal display panel.

Further, when the planar lighting device 5 of this modified example is used as the backlight lighting device of the liquid crystal display device, the semi-transmissive mirrors 551 can be arranged, so that a position where each laser beam of red color, green color, and blue color is emitted from the one major surface 50b is aligned with corresponding red color pixel unit, green color pixel unit, and blue color pixel unit constituting the pixel of the liquid crystal display panel. By thus constituting the semi-transmissive mirrors 551, red laser beam, green laser beam, and blue laser beam emitted from the one major surface 50b are made incident in the red color pixel unit, the green color pixel unit, and the blue color pixel unit, respectively. In this case, the color filter can be omitted from the pixel of the liquid crystal display panel.

In addition, the optical element provided in the first light guide plate 50 may reflect only the linearly-polarized laser beam that has the polarization axis directed to a prescribed direction among from the laser beams propagating through the first light guide plate 50 and emit a part of such laser beam in the direction substantially vertical to one major surface 50b. Thus, the degree of the polarization of the laser beam emitted from the one major surface substantially vertically is further improved, and it is possible to obtain the planar lighting device 5 capable of planarly emitting the laser beam having excellent linearly-polarized performance.

Figure 9A:
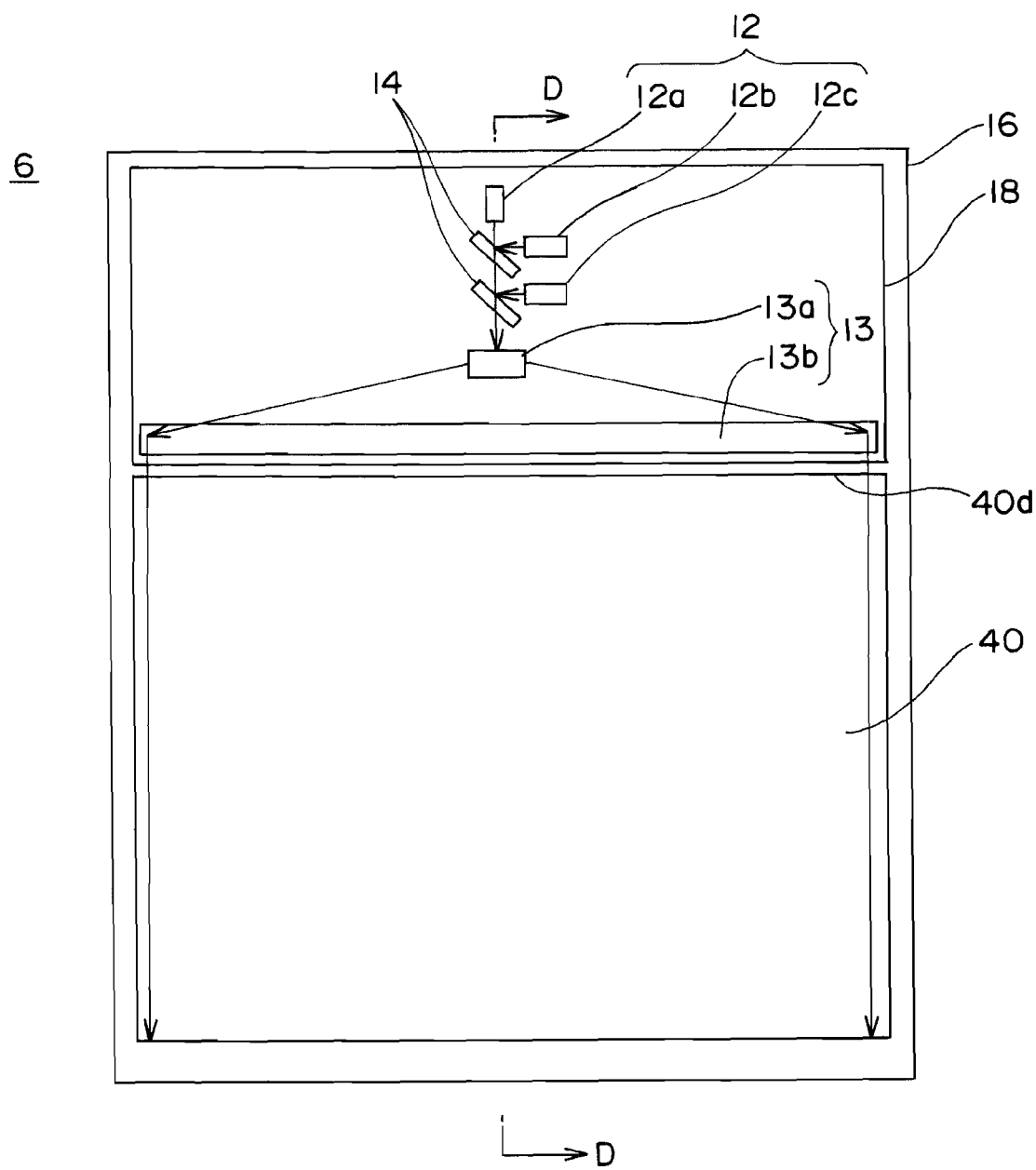
FIG. 9A is a schematic plan view of a configuration of a liquid crystal display device using the planar lighting device of the second embodiment as the backlight lighting device.
Figure 9B:
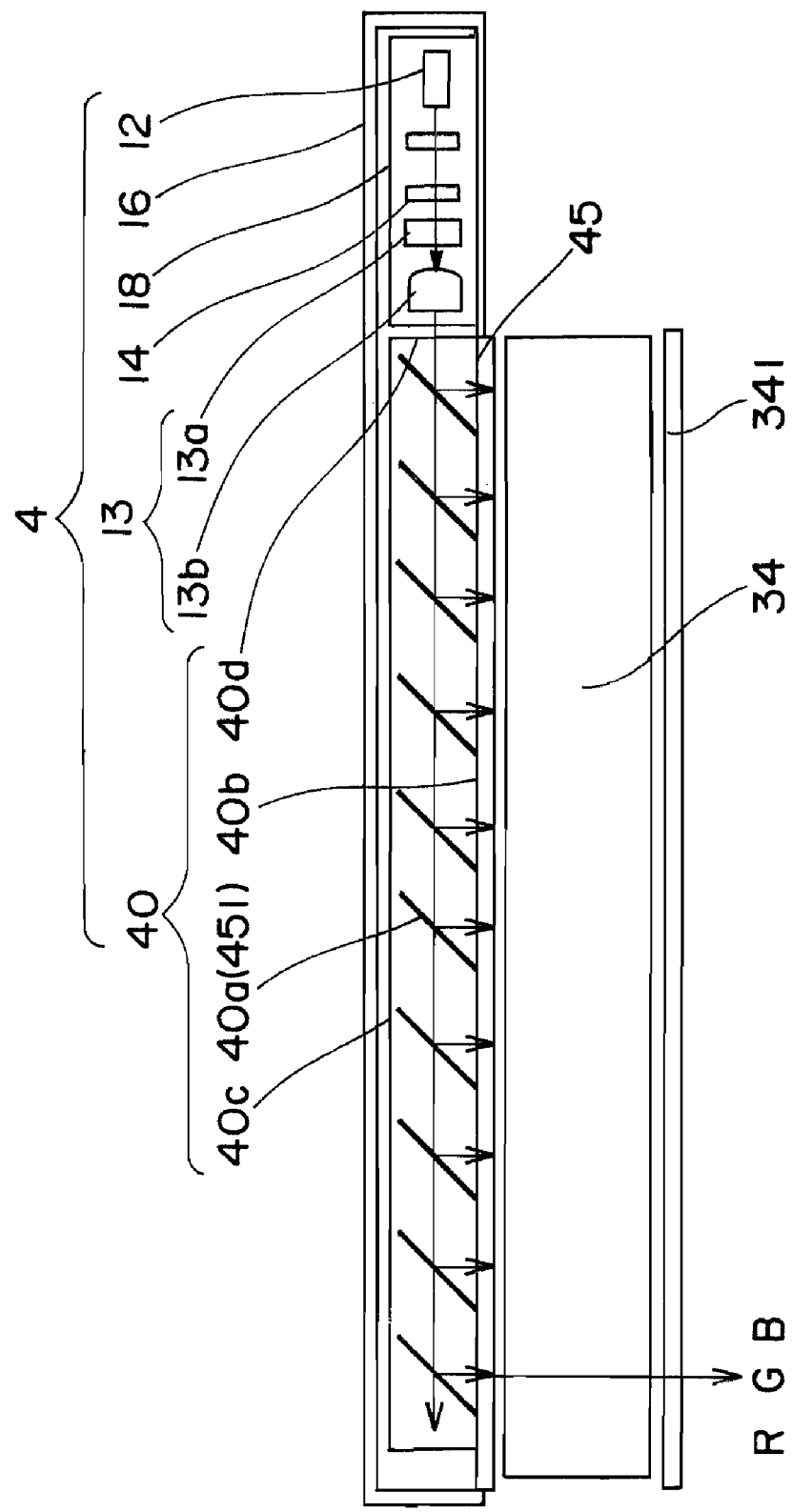
FIG. 9B is a schematic sectional view along the line D-D of FIG. 9A.

FIG. 9A and FIG. 9B are views illustrating the configuration of a liquid crystal display device 6 using a planar lighting device 4 according to the present embodiment as the backlight lighting device. FIG. 9A is a plan view illustrating an outline of the configuration, and FIG. 9B is a schematic sectional view along the line D-D of FIG. 9A. In this illustration of the liquid crystal display device 6 also, the surfaces of a casing 16 and a housing part 18 are respectively cut-out, thus making it easy to understand the internal structure. The liquid crystal display device 6 of the present embodiment illustrated in FIG. 9A and FIG. 9B is compared to the liquid crystal display device 3 of the first embodiment illustrated in FIG. 5A and FIG. 5B, and a different point is that each optical element 40a of the first light guide plate 40 of the planar lighting device 4, being the backlight lighting device, are the semi-transmissive mirrors 451.

As illustrated in FIG. 9B, the liquid crystal display device 6 of the present embodiment includes a liquid crystal display panel 34 having a polarizing plate 341 on the side of the display surface, namely on the viewer side, and the backlight lighting device for illuminating the liquid crystal display panel 34 from its back side. This backlight lighting device is the aforementioned planar lighting device 4.

Note that in the liquid crystal display device 6 of the present embodiment, a deflector sheet 45 is disposed for deflecting the advancing direction of the laser beam to the one major surface 40b of the first light guide plate 40 and expanding the viewing angle of the liquid crystal display screen. As the deflector sheet 45, the diffuser plate composed of, for example, a transparent acrylic resin or polyoefin resin materials, the lens sheet, or the prism sheet can be used. Thus, the laser beam is uniformly spread in an oblique direction from the entire surface of the one major surface 40b of the backlight lighting device, and therefore it is possible to obtain the liquid crystal display device 6 of a uniform display with a wide viewing angle.

Also, the semi-transmissive mirrors 451 of the first light guide plates 40 are extended almost linearly in the direction vertical to the propagation direction of the laser beam, and are arranged side by side along the propagation direction of the laser beam. Each semi-transmissive mirror 451 is provided, so that its reflectance is varied step by step from the side of the incident surface (the side of the one end face portion 40d) of the first light guide plate 40 along the propagation direction of the laser beam. Thus, the linearly-polarized laser beam having the uniform luminance over the entire surface from the one major surface 40b can be emitted, and therefore it is possible to obtain the liquid crystal display device 6 having the uniform luminance in the surface.

Similarly to the liquid crystal display device 3 according to the first embodiment, the direction of the polarization axis of the polarizing plate 341 on the display surface side of the liquid crystal display panel 34 and the polarization axis of the linearly-polarized laser beam emitted from the planar lighting device 4 form a prescribed intersection angle. That is, in the liquid crystal display device 6, the liquid crystal display panel 34 is illuminated from its back side by the linearly-polarized laser beam emitted from the one major surface 40b, with the intersection angle formed by the direction of the polarization axis and the direction of the polarization axis of the polarizing plate 341 on the display surface side of the liquid crystal display panel 34. For example, in a case of the twist nematic type liquid crystal display panel, the intersection angle is set at 0 degree or 90 degrees, and in a case of the homeotropic type liquid crystal display panel, the intersection angle is set at 0 degree. In the liquid crystal display device 6 having such a configuration, there is no necessity for providing the polarizing plate on the back side of the liquid crystal display panel 34. Note that the one major surface 40b of the first light guide plate 40 of the planar lighting device 4, the deflector sheet 45, and the liquid crystal display panel 34 are closely in contact with one another.

The liquid crystal display panel 34 has a transmissive type or a semi-transmissive type structure, and is formed, for example, in a TFT active matrix type liquid crystal display panel, wherein a plurality of pixels are provided in the display region, with the red color pixel unit, the green color pixel unit, and the blue color pixel unit set as one pixel unit, and is driven by the TFT. Then, the liquid crystal display layer is oriented and provided in a prescribe direction between two glass substrates. In addition, the TFT for driving this liquid crystal layer is formed in one of the glass substrates, although they are not illustrated. This liquid crystal display panel 34 is equivalent to a conventional one, excluding the point that the polarizing plate on the back side of the panel can be omitted.

In the liquid crystal display device 6 of the present embodiment, the planar lighting device 4 is used as the backlight lighting device, for reflecting a part of the laser beam by the semi-transmissive mirrors 451, being the optical elements 40a, and emitting it from the one major surface 40b direction, thus emitting the linearly-polarized laser beam from the back side of the panel with high output. The linearly-polarized laser beam incident from the back side of the liquid crystal display panel with its polarization axis made uniform is changed its optical rotation and polarization condition due to a change of refringent anisotropy induced by the change of a liquid crystal molecule orientation in the operating liquid crystal layer, and then is subjected to optical intensity modulation by the polarization control of the display surface side polarizing plate 341 (analyzer) arranged at the display surface side, namely, at the viewer side. Then, the laser beam subjected to the optical intensity modulation emerges on the display surface side so the high quality image is displayed. The same acts with respect to the laser beam of each color. Therefore, a full color display can be realized.

As described above, since the light guiding plate on the back side can be omitted, the liquid crystal display device 6 of the present embodiment can improve about 50% or more of the light use efficiency, compared to the conventional type liquid crystal display device having the polarizing plate on the back side. In addition, it is possible to obtain emission wavelengths with extremely excellent color purity from the laser light source 12. Therefore, the color reproduction range can be largely expanded. As a result, the image display of further high image quality can be obtained compared to a system of using a conventional fluorescent display tube or an LED light source.

In addition, in the liquid crystal display device 6 of the present embodiment, the back side of the liquid crystal display panel is illuminated by the backlight lighting device, using the laser beam of each color emitted from the one major surface while maintaining the polarization state. However, the present invention is not limited thereto. For example, the planar lighting device 5 illustrated in FIG. 8 may be used as the backlight lighting device. In this case, the laser beam separated into at least red color, green color, and blue color are emitted from the one major surface 50*b*, and the laser beam of each color may be respectively incident on the red color pixel unit, the green color pixel unit, and the blue color pixel unit constituting each pixel of the liquid crystal display panel 34, so as to correspond thereto.

With this structure, the red color pixel unit, the green color pixel unit, and the blue color pixel unit constituting the pixel array of the liquid crystal display panel 34 can be individually illuminated with the laser beam of red color, green color, and blue color. Therefore, the color filters can be omitted. By removing the color filters, further brighter image display can be realized. Note that in order to have such a structure, the red color pixel unit, the green color pixel unit, and the blue color pixel unit constituting the pixel array of the liquid crystal display panel 34 are arranged side by side in a array shape corresponding to the semi-transmissive mirrors 551, and the red color pixel unit, the green color pixel unit, and the blue color pixel unit correspond to a position where the laser beam of each color reflected by the semi-transmissive mirrors 551 is emitted.

Third Embodiment

Figure 10A:
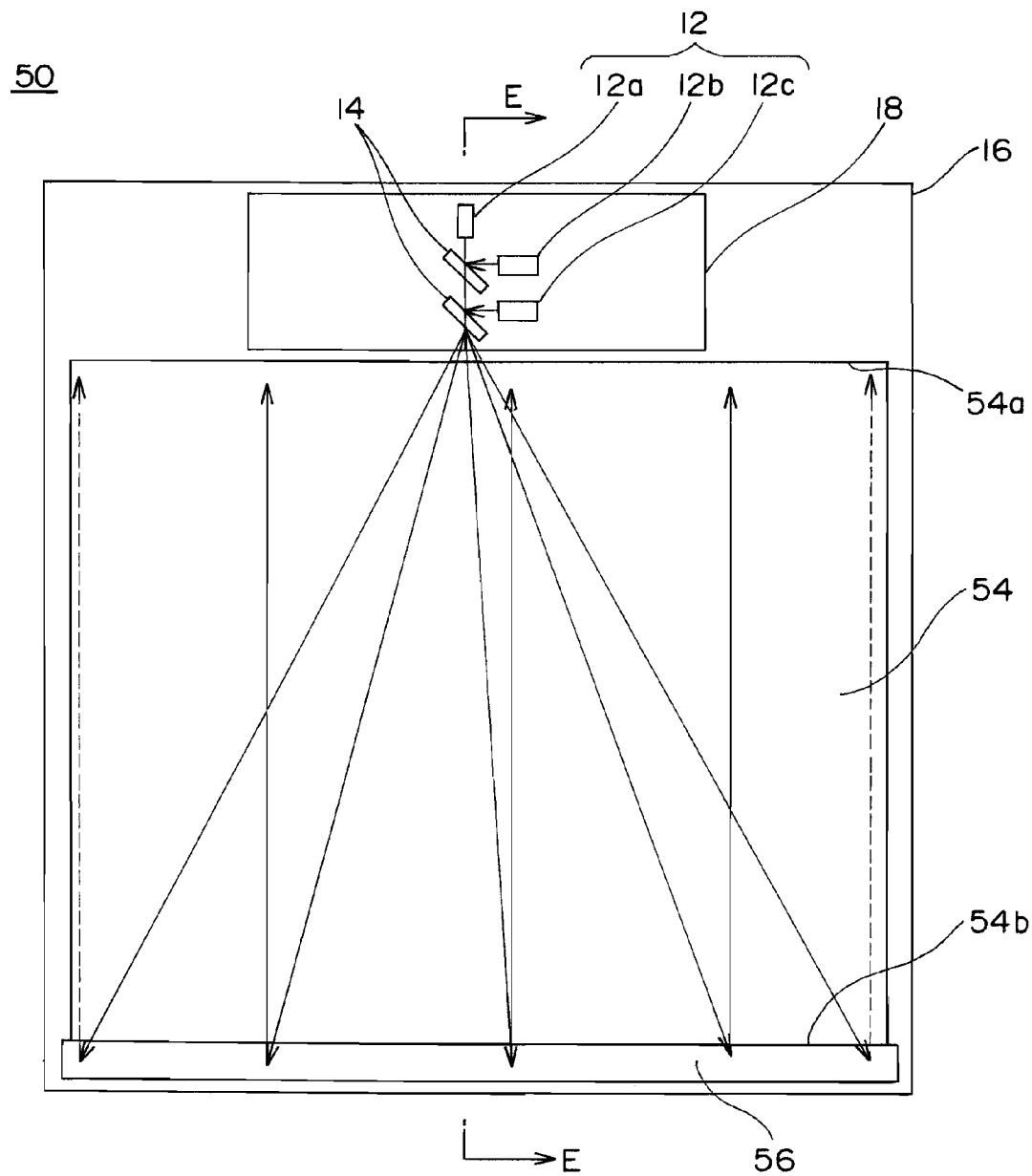
FIG. 10A is a schematic plan view of a configuration of a liquid crystal display device using the planar lighting device of a third embodiment as the backlight lighting device.

FIG. 10A and FIG. 10B are views illustrating a planar lighting device 50 according to a third embodiment of the present invention. FIG. 10A is a plan view illustrating the outline of the structure, and FIG. 10B is a schematic sectional view along the line E-E of FIG. 10A. In this illustration of the planar lighting device 50, the surface of a casing 16 and a housing part 18 are respectively cut-out, thus making it easy to understand the internal structure.

Explanation will be given hereunder for a different point between the planar lighting device 50 illustrated in FIG. 10A and FIG. 10B, and the planar lighting device of the first embodiment. First of all, the planar lighting device 50 is different from the planar lighting device 1 in the point that an optical path conversion unit 56 is provided, for converting an optical path of the laser beam emitted from the laser light source 12. The optical path conversion unit 56 of the planar lighting device 50 has a function of converting the laser beam made incident on the optical path conversion unit 56 into the parallelized laser beam and making such parallelized laser beam incident in the one end face portion 58*d* of a first light guide plate 58. Secondly, the planar lighting device 50 is different from the planar lighting device 1 in the point that a second light guide plate 54 (second light guide) is further provided, for guiding the laser beam emitted from the laser light source 12 to the optical path conversion unit 56. The second light guide plate 54 of the planar lighting device 50 is provided so as to laminate on the another major surface 58*c* of the first light guide plate 58, the laser light source 12 is disposed on the side of the one end face portion 54*a* of the second light guide plate 54, and the optical path conversion unit 56 is disposed on the side of another end face portion 54*b* of the second light guide plate 54.

In addition, as illustrated in FIG. 10A, the laser light source 12 has at least three light sources such as a R-light source 12*a*, a G-light source 12*b*, and a B-light source 12*c*. Further, although not illustrated, an optical member may be disposed, for uniformly making the laser beam emitted from the laser light source 12, incident on the optical path conversion unit 56 as a flat beam.

In the optical conversion part 56, for example a reflector or a triangular prism and the like, can be used. Further, in this optical path conversion unit 56, the laser beam is made incident in the first light guide plate 58 without leakage, and in order to obtain a further uniform planar illumination light, a minute convexo-concave shape (not shown in the figure) may be provided on its inside surface, so as to adjust the angle based on the incident angle. Alternately, by bending the optical path conversion unit 56 at a prescribed curvature, the laser beam may be made incident as parallel light in a prescribed direction into the surface of the first guide plate 58. By applying such a shape processing to the optical path conversion unit 56, the laser beam incident on the first light guide plate 58 can be made the parallel light substantially. Therefore, the hologram layers and the semi-transmissive mirrors and the like, can be easily designed, thus making it possible to further uniformize an optical intensity distribution in the surface.

Note that a transparent resin material having excellent optical characteristics and moldability can be used in the first light guide plate 58 and the second light guide plate 54. Particularly, the acrylic resin or the polyolefin resin with a small double refraction is preferably used.

In addition, in the present embodiment, in the optical elements 58*a* of the first light guide plate 58, hologram layers 581 of the same structure as that of the hologram layers 251 in the first embodiment are used, and for example, the phase modulation type volume holograms and the planar phase modulation type computer-generated holograms are provided.

An entire body of the planar lighting device 50 according to the present embodiment can be made smaller than the planar lighting device according to the previous embodiment. In addition, by providing the second light guide plate 54, the laser beam generated by the laser light source 12 can be transmitted without allowing the leakage of light in the optical path conversion unit 56 through the second light guide plate 54. In addition, even if dust and the like, is adhered to or entrained in the planar lighting device 50, the laser beam are not blocked, thus making it possible to improve reliability of the planar lighting device 50.

Note that in the planar lighting device 50 of the present embodiment, explanation is given for a case of using the hologram layers 581 as the optical elements 58*a* in the first light guide plate 58. However, the present invention is not limited thereto. For example, the structure of the first light guide plate 40 may be adopted, wherein the semi-transmissive mirrors 451 explained in the planar lighting device 4 of the second embodiment is used.

In addition, in the planar lighting device 50 of the present embodiment, explanation is given for the structure of providing the second light guide plate 54. However, the present invention is not limited thereto. For example, the laser beams may be made incident on the optical path conversion unit 56 via air (air layer) from the laser light source 12.

Figure 11A:
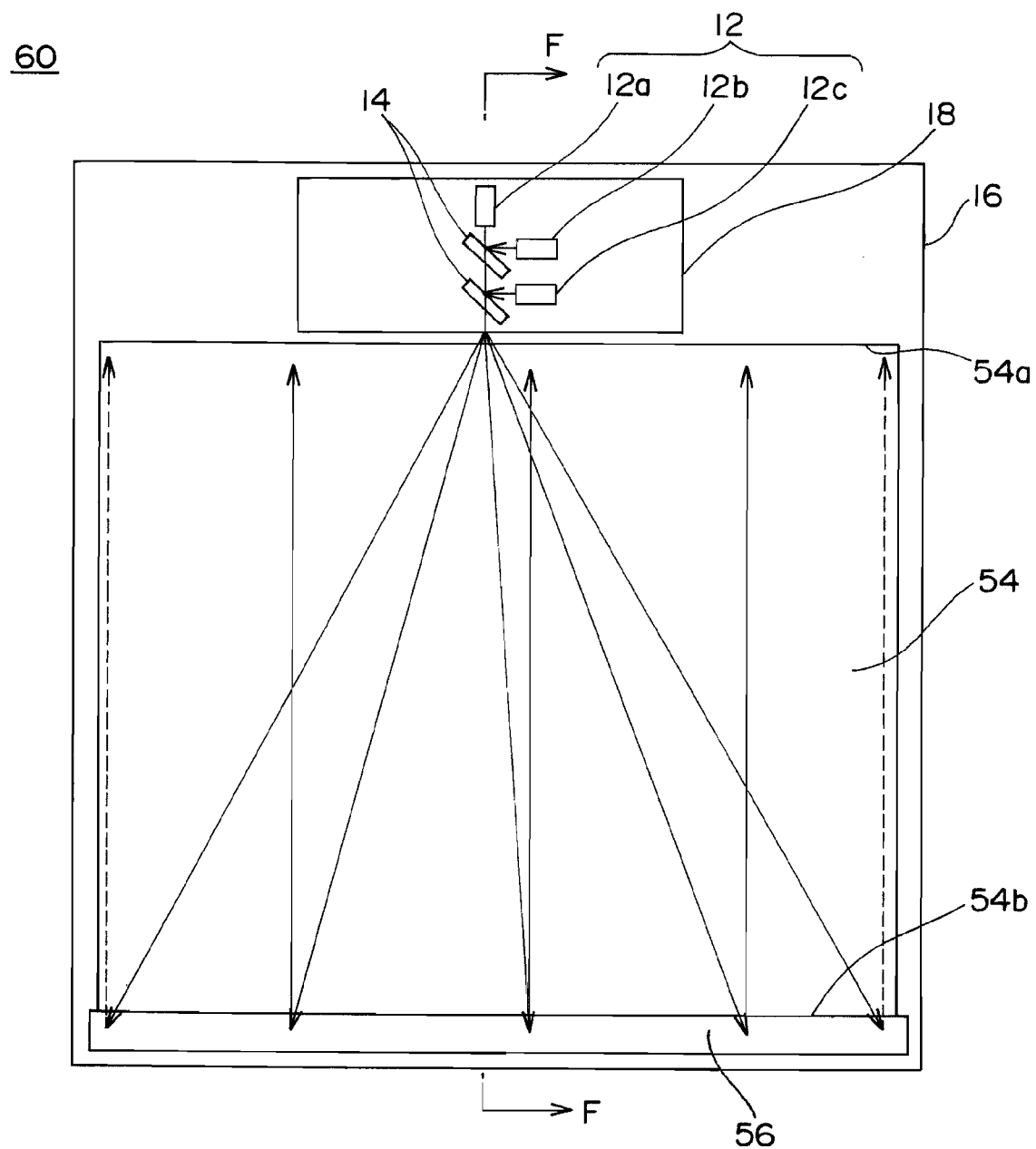
FIG. 11A is a schematic plan view of a configuration of a liquid crystal display device using the planar lighting device of the third embodiment as the backlight lighting device.

FIG. 11A and FIG. 11B are views illustrating the configuration of a liquid crystal display device 60 wherein the planar lighting device 50 according to the present embodiment is used as the backlight lighting device. FIG. 11A is a schematic plan view, and FIG. 11B is a schematic sectional view along the line F-F of FIG. 11A. In this illustration of the liquid crystal display device 60 also, the surfaces of a casing 16 and a housing part 18 are respectively cut-out, thus making it easy to understand the internal structure.

The liquid crystal display device 60 of the present embodiment includes a liquid crystal display panel 34 having a polarizing plate 341 provided on the display surface side, namely on the viewer side, and the backlight lighting device for illuminating the liquid crystal display panel 34 from its back side. This backlight lighting device is the aforementioned planar lighting device 50. One major surface 58b of a first light guide plate 58 of the planar lighting device 50, a deflector sheet 55, and the liquid crystal display panel 34 are closely in contact with one another.

Note that in the present embodiment, the deflector sheet 55 is disposed between the one major surface 58b of the first light guide plate 58 and the back side of the liquid crystal display panel 34, so that the laser beam is also spread in an obliquely viewing direction. The diffuser plate, the lens sheet, or the prism sheet can be used in this deflector sheet 55.

The liquid crystal display panel 34 has the transmissive type or the semi-transmissive type structure, and for example is the TFT active matrix type liquid crystal display panel, wherein a plurality of pixels are provided in the display region, with the red color pixel unit, the green color pixel unit, and the blue color pixel unit set as one pixel unit, and is driven by the TFT. Regarding this liquid crystal display panel 34, the liquid crystal display panel 34 explained in the liquid crystal display device 3 of the first embodiment can be used, and therefore further explanation is omitted.

In the liquid crystal display device 60 of the present embodiment, the planar lighting device 50 is used as the backlight lighting device, for diffracting a part of the laser beam 12 by the hologram layers 581 and emitting it from the one major surface 58b, and therefore the liquid crystal display panel 34 can be illuminated by the linearly-polarized laser beam of high output, from the back side of the liquid crystal display panel 34.

The laser beam made incident from the back side, with the polarization axis aligned, is changed its optical rotation and polarization condition due to a change of refringent anisotropy induced by the change of a liquid crystal molecule orientation in the operating liquid crystal layer, and then is subjected to optical intensity modulation by the polarization control of the display surface side polarizing plate 341 (analyzer) arranged at the display surface side, namely, at the viewer side. Then, the laser beam subjected to the optical intensity modulation emerges on the display surface side so the high quality image is displayed. The same acts with respect to the laser beam of each color. Therefore, a full color display can be realized.

With this structure, a part of the laser beam is diffracted or reflected while maintaining the polarization condition, and the liquid crystal display panel 34 can be uniformly illuminated by the linearly-polarized laser beam of a prescribe emission wavelengths emitted from the one major surface 58b, and the polarizing plate on the back side of the liquid crystal display panel 34 can be omitted. Accordingly, the light use efficiency can be largely improved and the color display of high image quality with high luminance and wide color reproduction range becomes possible.

In addition, by further providing the optical path conversion unit 56 for converting the optical path of the laser beam emitted from the laser light source 12, the planar lighting device 50, being the backlight lighting device, can be more miniaturized than the planar lighting device according to the previous embodiment. Thus, the liquid crystal display device can also be further miniaturized. Further, the optical path conversion unit 56 makes the laser beam incident on the one end face portion 58d of the first light guide plate 58 as the parallel light, thus making it easy to design the hologram layers 581, being the optical elements 58a, and the in-surface optical intensity distribution can be made uniform. Therefore, further uniform display is realized, as the liquid crystal display device 60.

In addition, the planar lighting device 50, being the backlight lighting device, further includes a second light guide plate 54 for guiding the laser beam to the optical path conversion unit 56. Therefore, the laser beam can be transmitted to the optical path conversion unit 56 through the second light guide plate 54 without the leakage of light. Moreover, even if the dust and the like, is adhered to or entrained in the planar lighting device 50, the laser beam are not blocked, and therefore the liquid crystal display device 60 with high quality can be realized.

Note that the planar lighting device 50, being the backlight lighting device, may be so constituted that the laser beams from the one major surface 58d separated at least into red color, green color, and blue color are respectively made incident on the red color pixel unit, the green color pixel unit, and the blue color pixel unit constituting the pixel array of the liquid crystal display panel 34. Thus, the red color pixel unit, the green color pixel unit, and the blue color pixel unit constituting the pixel array of the liquid crystal display panel 34 can be illuminated with the laser beam of red color, green color, and blue color individually, thus making it possible to omit the color filters. By removing the color filters, further brighter display can be obtained.

Note that the transparent resin material having excellent optical characteristics and moldability can be used in the first light guide plate 58 and the second light guide plate 54. Particularly, acrylic resin or polyolefin resin with low double refraction is preferably used.

Fourth Embodiment

Figure 12A:
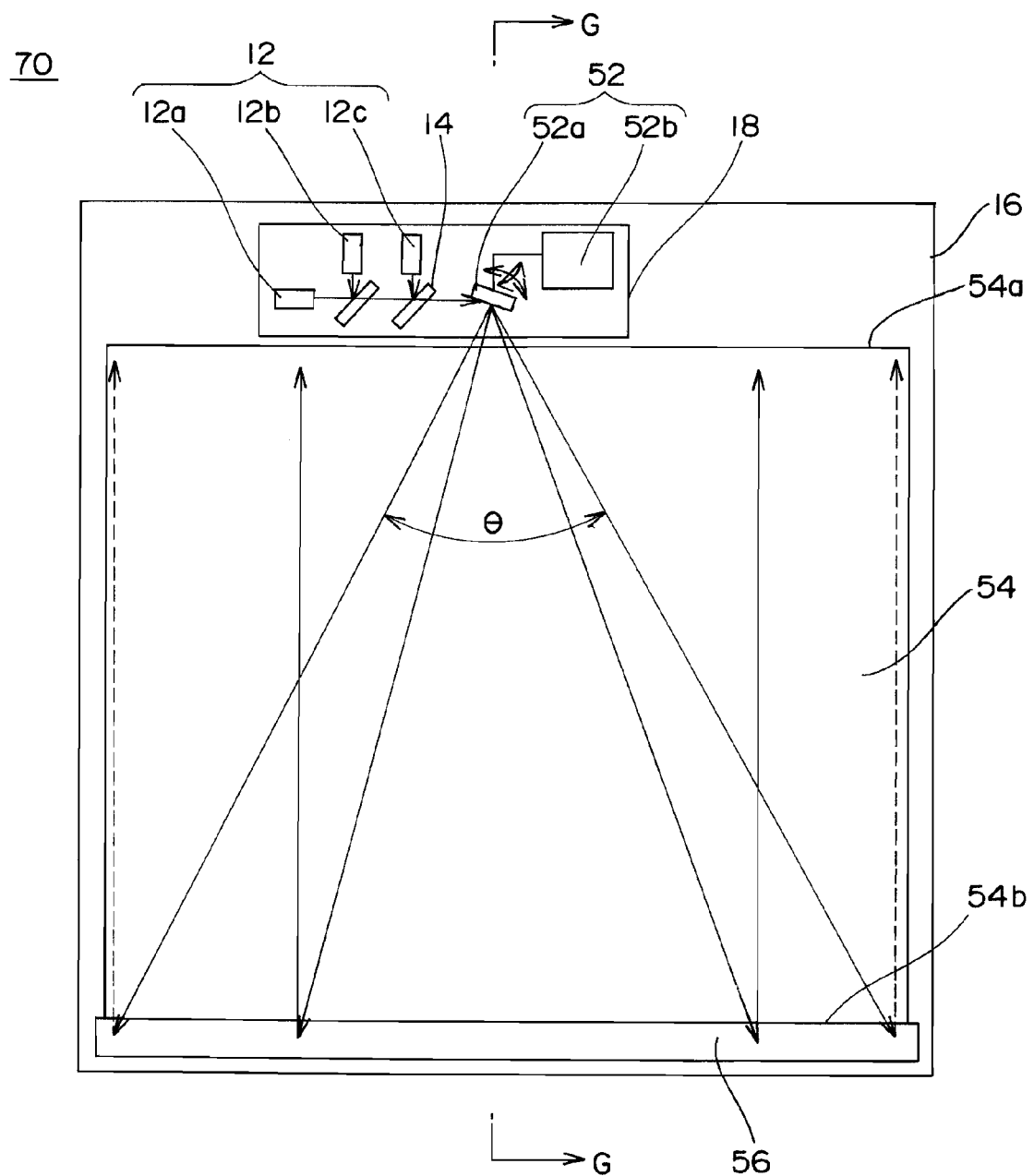
FIG. 12A is a schematic plan view of a configuration of a planar lighting device according to a fourth embodiment of the present invention.
Figure 12B:
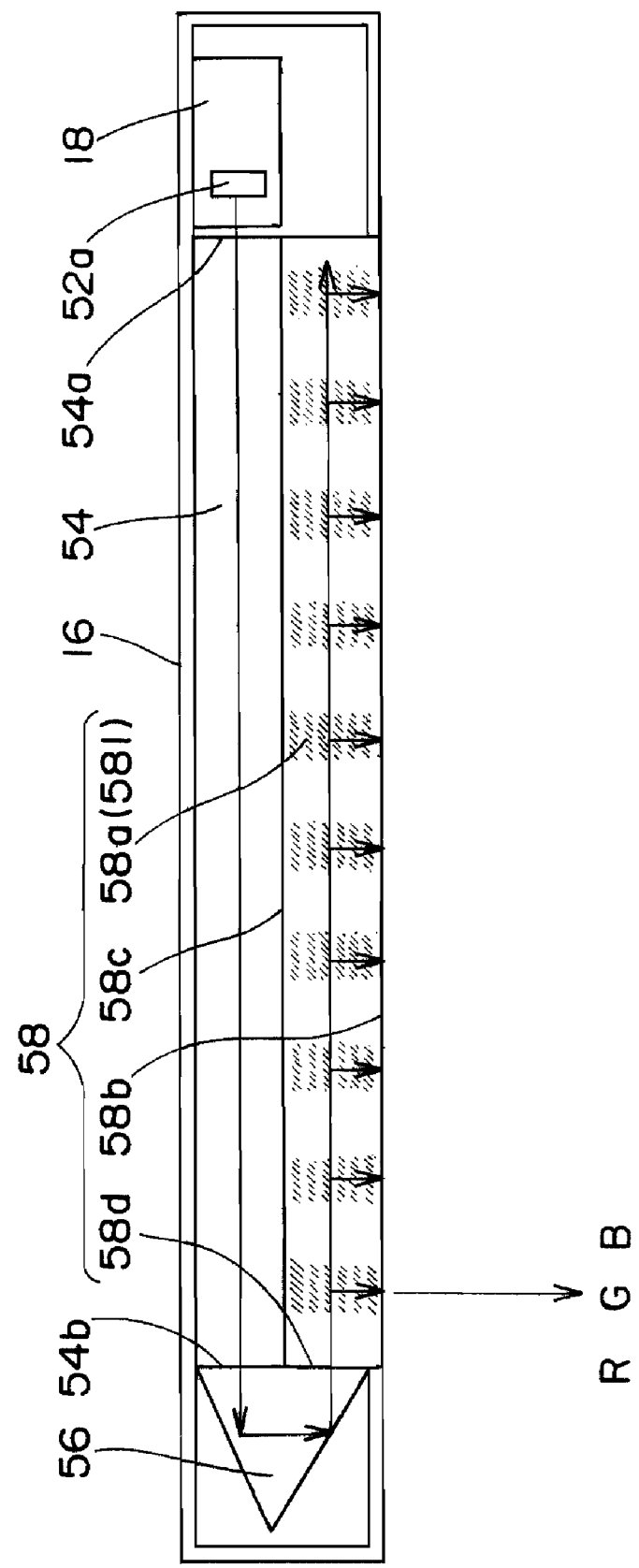
FIG. 12B is a schematic sectional view along the line G-G of FIG. 12A.

FIG. 12A and FIG. 12B are views illustrating a planar lighting device 70 according to a fourth embodiment of the present invention. FIG. 12A is a plan view illustrating the outline of the structure, and FIG. 12B is a schematic sectional view along the line G-G of FIG. 12A. In this illustration of the planar lighting device 70, each surface of a casing 16 and a housing part 18 is cut-out, thus making it easy to understand the internal structure.

When compared to the planar lighting device 50 of the third embodiment, the planar lighting device 70 illustrated in FIGS. 12A and 12B is different from the planar lighting device 50 in the point that the laser beam emitted from the laser light source 12 is guided to the one end face portion 54a of the second light guide plate 54.

As illustrated in FIG. 12A, the planar lighting device 70 of the present embodiment collimates the laser beam from a laser light source 12 composed of a R-light source 12a, a G-light source 12b, and a B-light source 12c, which is then multiplexed, for example, by a dichroic mirror 14 and is made incident on a beam scanning unit 52. The beam scanning unit 52 includes a reflection mirror 52a and an angle adjustment mechanism 52 for changing the angle of this reflection mirror 52a. Then, by using this angle adjustment mechanism 52b, the angle of the reflection mirror 52a is changed at a high speed, and the laser beam is made incident on the optical path conversion unit 56 via the second light guide plate 54. That is, as illustrated in FIG. 12A, the reflection mirror 52a is deflected and scanned at a deflection scanning angle θ for illuminating the entire surface of the optical path conversion unit 56 with the laser beam in a length direction. As illustrated in the figure, the deflection scanning angle θ is the angle in the reflection mirror 52a, formed by both ends of the laser beam deflected and propagated by the reflection mirror 52a.

The reflection mirror 52a can be formed by a micro-electro-mechanical system (MEMS) technique, by using a silicon substrate. Further, the angle adjustment mechanism 52b can be integrally formed for generating the deflection scanning angle by, for example, a dielectric element using the MEMS technique. With this structure, a shape of the beam scanning unit 52 can be significantly miniaturized.

Thus, the laser beam is made incident on the entire body of the optical path conversion unit 56 in the length direction, and the parallelized laser beam can be uniformly made incident in the entire body of the one end face portion 58*d* of the first light guide plate 58 from the optical path conversion unit 56. For example, a cylindrical Fresnel lens surface is formed on the optical path conversion unit 56, with the reflection mirror 52*a* being as a focal point. By the working of this surface, the laser beam emitted from the other end face portion 54*b* of the second light guide plate 54 are made parallel.

The liquid crystal display device using the planar lighting device 70 of the present embodiment as the backlight lighting device has the same structure as that of the liquid crystal display device 60 of the third embodiment, and therefore explanation therefore is omitted.

Note that in the third embodiment and the fourth embodiment, explanation is given for the case the hologram layers are used as the optical elements of the first light guide plate. However, the present invention is not limited thereto. It is possible to use the first light guide plate wherein the semi-transmissive mirror is used. In addition, similarly to the structure illustrated in FIG. 8, it is possible to provide the first light guide plate, the second light guide plate, and the optical path conversion unit, corresponding to the R-light source 12*a*, the G-light source 12*b*, and the B-light source 12*c*, respectively. With this structure, the color filters can be omitted. That is, similarly to the structure explained in FIG. 8, the laser beams from the one major surface separated into at least red color, green color, and blue color may be made incident on the red color pixel unit, the green color pixel unit, and the blue color pixel unit constituting the pixel array of the liquid crystal display panel, so as to correspond thereto.

With this structure, the red color pixel unit, the green color pixel unit, and the blue color pixel unit constituting the pixel array of the liquid crystal display panel are individually illuminated with the laser beams of red color, green color, and blue color, thus making it possible to omit the color filters. By removing the color filters, further brighter display can be obtained. Note that in order to have such a structure, the red color pixel unit, the green color pixel unit, and the blue color pixel unit constituting the pixel array of the liquid crystal display panel is preferably arranged in a array shape corresponding to an arrangement of the hologram layers or the semi-transmissive mirrors, respectively, and the laser beam of each color is emitted from the position corresponding to these red color pixel unit, green color pixel unit, and blue color pixel unit.

Note that the parallelized laser beam incident on the first light guide plate explained in the first embodiment to the fourth embodiment may have a little bit of divergence performance. However, a divergence angle in this case is preferably set at +/−10 degrees or less, and more preferably set at +/−5 degrees or less. Here, the divergence angle may be the angle formed by outer edge portions of the laser beam of the parallel lights which shares the optical axis and the laser beam having the divergence performance. The outer edge portion may be a part having an optical intensity, which is lower than the optical intensity of a central part in the aforementioned each laser beam by a prescribed ratio.

In addition, in the embodiment of the preset invention, in order to increase an advantage of improving the luminance to maximum, the liquid crystal display device having a form of excluding the polarizing plate between the backlight lighting device and the liquid crystal display panel, namely, on the back side of the liquid crystal display panel, is given as an example for explanation. However, in order to increase the contrast of the liquid crystal display device, the polarizing plate may be added to the back side. Even when the polarizing plate is used on the back side, there is almost no polarization component blocked by the polarizing plate on the back side, which is not required as is explained in the first embodiment to the fourth embodiment. Therefore, there is almost no light which is removed by the polarizing plate on the back side, like the conventional type liquid crystal display device, in the liquid crystal display device according to the present invention. Even when the polarizing plate is used on the back side, the removed light is suppressed to minimum, and the advantage of increasing the luminance of liquid crystal display is similarly obtained. In addition, a hollow light guide or a flexible film that can be bended may be used in the light guide plate of the present invention. Note that in the present invention, a multi-mode fiber and the like, may be included in the laser light source. In this case, the polarization state of the laser beams emitted from the laser light source is randomized. However, when the planar lighting device (backlight lighting device) is constituted, so that the existent polarization converting element is added to the planar lighting device (backlight lighting device) of the present invention, then the laser beam having the random polarization property are linearly polarized, and the linearly polarized laser beam is made incident on the first light guide, it is possible to obtain the planar lighting device (backlight lighting device) capable of exhibiting the advantage similar to that of the embodiment exemplified in the specification.

INDUSTRIAL APPLICABILITY

The planar lighting device and the liquid crystal display device using the same according to the present invention is capable of realizing the planar lighting device that emits linearly-polarized light from the one major surface direction by using the laser beam, and having a uniform luminance in the surface. By using this planar lighting device, it is possible to realize the liquid crystal display device of high image quality and having high light use efficiency and high luminance. Therefore, the present invention is useful in a display field.

The invention claimed is:

1. A planar lighting device, comprising:
a laser light source that emits a linearly-polarized laser beam;
an optical member that parallelizes the laser beam and emits the parallelized laser beam; and
a first plate-shaped light guide that has a first major surface, receives the parallelized laser beam from an end face portion and emits at least a part of the laser beam from said first major surface,
wherein: the parallelized laser beam emitted from said optical member enters said first plate-shaped light guide through said end face portion such that a propagation direction of the parallelized laser beam is substantially parallel to surfaces other than a surface of said end face portion and a surface opposed to said surface of said end face portion, the surfaces constituting said first plate-shaped light guide; and
said first light guide includes an optical element that receives the linearly-polarized parallelized laser beam propagating through said first light guide and emits at least a part of the parallelized laser beam in a direction substantially vertical to the first major surface.

2. The planar lighting device according to claim 1, wherein said laser light source emits red laser light, green laser light, and blue laser light at least.

3. The planar lighting device according to claim 1, wherein:
said optical element is a hologram layer;
a plurality of said hologram layers are arranged intermittently at intervals of a specific pitch along a propagation direction of the parallelized laser beam propagating through said first light guide; and
said hologram layers each diffract at least a part of the parallelized laser beam and emit the beam in a direction substantially vertical to said first major surface.

4. The planar lighting device according to claim 3, wherein said hologram layer is a phase modulation type volume hologram.

5. The planar lighting device according to claim 3, wherein said hologram layer is a planar phase modulation type computer-generated hologram.

6. The planar lighting device according to claim 3, wherein:
said plurality of hologram layers each extends substantially linearly in a direction vertical to the propagation direction of the parallelized laser beam;
said hologram layers extending substantially linearly are disposed intermittently at intervals of a specific pitch along the propagation direction of the parallelized laser beam; and
diffraction efficiencies of said hologram layers increase monotonously from said end face portion along the propagation direction of the parallelized laser beam.

7. The planar lighting device according to claim 1, wherein:
said optical element is a semi-transmissive mirror;
a plurality said semi-transmissive mirrors is disposed at intervals of a specific pitch along a propagation direction of the parallelized laser beam propagating through said first light guide so that each of said semi-transmissive mirrors reflect at least a part of the parallelized laser beam and emit the reflected beam in a direction substantially vertical to the first major surface.

8. The planar lighting device according to claim 7, wherein:
said plurality of the semi-transmissive mirrors each extend substantially linearly in a direction vertical to the propagation direction of the parallelized laser beam;
said semi-transmissive mirrors extending substantially linearly are disposed intermittently at intervals of a specific pitch along the propagation direction of the parallelized laser beam; and
reflectances of said semi-transmissive mirrors increase monotonously from said end face portion along the propagation direction of the parallelized laser beam.

9. The planar lighting device according to claim 1, wherein:
said optical member includes an optical path conversion unit that converts an optical path of the laser beam and emits the laser beam;
said optical path conversion unit receives the laser beam, folds back the optical path of the laser beam, and makes the parallelized laser beam incident onto said end face portion.

10. The planar lighting device according to claim 9, further comprising a second light guide that receives the laser beam and guides the laser beam to said optical path conversion unit, wherein:
said second light guide is disposed on a major surface of said first light guide in parallel and in close contact with each other, said major surface being different from said first major surface; and
said laser light source and said optical path conversion unit are disposed near an end face portion of said second light guide.

11. The planar lighting device according to claim 1, wherein said optical element emits only the parallelized laser beam of which polarization axis directs to a prescribed direction in a direction substantially vertical to said first major surface among from the linearly-polarized parallelized laser beam.

12. The planar lighting device according to claim 1, wherein said optical element emits the parallelized laser beam in a direction substantially vertical to said first major surface with a linear polarization condition of the parallelized laser beam maintained.

13. A liquid crystal display device, comprising:
a liquid crystal display panel having a polarizing plate provided on a display surface side; and
a backlight lighting device that illuminates said liquid crystal display panel from a back side which is the opposite side of the display surface side,
wherein: said backlight lighting device includes: a laser light source that emits a linearly-polarized laser beam; an optical member that parallelizes the laser beam and emits the parallelized laser beam; and a first plate-shaped light guide that has a first major surface, receives the parallelized laser beam from an end face portion and emits at least a part of the laser beam from said first major surface;
the parallelized laser beam emitted from said optical member enters said first plate-shaped light guide through said end face portion such that a propagation direction of the parallelized laser beam is substantially parallel to surfaces other than a surface of said end face portion and a surface opposed to said surface of said end face portion, the surfaces constituting said first plate-shaped light guide;
said first light guide has an optical element to receive the linearly-polarized parallelized laser beam propagating through said first light guide and emits at least a part of the parallelized laser beam in a direction substantially vertical to said first major surface;
said liquid crystal display panel is disposed such that said back side of said liquid crystal display panel is in close contact with said first major surface of said first light guide; and
the laser beam emitted from said first major surface is incident in said back side of said liquid crystal display panel with a polarization axis of the laser beam forming a prescribed intersection angle with respect to the polarization axis direction of said polarizing plate.

14. The liquid crystal display device according to claim 13, wherein said laser light source emits red laser beam, green laser beam, and blue laser beam at least.

15. The liquid crystal display device according to claim 13, wherein:
said optical element is a hologram layer;
a plurality of said hologram layers are disposed intermittently at intervals of a specific pitch along a propagation direction of the parallelized laser beam propagating through said first light guide;

said hologram layers each diffract at least a part of the parallelized laser beam and emit the beam in a direction substantially vertical to said first major surface.

16. The liquid crystal display device according to claim 15, wherein said hologram layer is a phase modulation type volume hologram.

17. The liquid crystal display device according to claim 16, wherein said phase modulation type volume hologram is a three wavelengths multiple hologram by three wavelengths corresponding to red light, green light, and blue light at least.

18. The liquid crystal display device according to claim 16, wherein said phase modulation type volume hologram includes three kinds of single wavelength holograms that are disposed at intervals of a specific pitch and correspond to a red light wavelength, a green light wavelength, and a blue light wavelength, respectively.

19. The liquid crystal display device according to claim 16, wherein said hologram layer is a planar phase modulation type computer-generated hologram.

20. The liquid crystal display device according to claim 19, wherein:
said first light guide includes a sub-light guide that corresponds to a wavelength of the laser beam emitted by said laser light source; and
said planar phase modulation type computer-generated hologram corresponding to a wavelength of the parallelized laser beam propagating through said sub-light guide is formed in said sub-light guide.

21. The liquid crystal display device according to claim 15, wherein:
said plurality of said hologram layers each extend substantially linearly in a direction vertical to the propagation direction of the parallelized laser beam;
said hologram layers extending substantially linearly are disposed intermittently at intervals of a specific pitch along the propagation direction of the parallelized laser beam; and
diffraction efficiencies of said hologram layers increase monotonously from said end face portion along the propagation direction of the parallelized laser beam.

22. The liquid crystal display device according to claim 13, wherein:
said optical element is a semi-transmissive mirror;
a plurality of said semi-transmissive mirrors are disposed at intervals of a specific pitch along the propagation direction of the parallelized laser beam propagating through said first light guide so that each of said semi-transmissive mirrors reflects at least a part of the parallelized laser beam and emits the reflected beam in a direction substantially vertical to said first major surface.

23. The liquid crystal display device according to claim 22, wherein:
said plurality of said semi-transmissive mirrors each extend substantially linearly in a direction vertical to the propagation direction of the parallelized laser beam;
said semi-transmissive mirrors extending substantially linearly are disposed intermittently at intervals of a specific pitch along the propagation direction of the parallelized laser beam; and
reflectances of said semi-transmissive mirrors increase monotonously from said end face portion along the propagation direction of the parallelized laser beam.

24. The liquid crystal display device according to claim 13, wherein:
said optical member of said backlight lighting device includes an optical path conversion unit that converts an optical path of the laser beam and emits the laser beam;
said optical path conversion unit receives the laser beam, folds back the optical path of the laser beam, and makes the parallelized laser beam incident onto said end face portion.

25. The liquid crystal display device according to claim 24, wherein:
said backlight lighting device further includes a second light guide that receives the laser beam and guides the laser beam to said optical path conversion unit;
said second light guide is disposed on a major surface of said first light guide, said major surface being different from said first major surface, in parallel and in close contact with each other;
said laser light source and said optical path conversion unit are disposed near an end face portion of the second light guide.

26. The liquid crystal display device according to claim 14, wherein:
said liquid crystal display panel includes an array of pixels;
said pixels have a red color pixel unit, a green color pixel unit, and a blue color pixel unit;
the parallelized laser beam is emitted from said first major surface in a state where the parallelized laser beam is separated into at least a red laser beam, a green laser beam, and a blue laser beam; and
said optical elements arranged in said first light guide correspond to said array of pixels so that the red laser beam enters said red color pixel unit, the green laser beam enters said green color pixel unit, and the blue laser beam enters said blue color pixel unit.

27. The liquid crystal display device according to claim 13, wherein:
said backlight lighting device further includes a deflector sheet on said first major surface of said first light guide;
said deflector sheet deflects an advancing direction of the laser beam emitted from said first major surface.

28. The liquid crystal display device according to claim 27, wherein said deflector sheet includes at least one of a diffuser plate, a lens sheet, and a prism sheet.

29. The liquid crystal display device according to claim 13, wherein said optical element emits the parallelized laser beam in a direction substantially vertical to said first major surface with a linear polarization condition of the parallelized laser beam maintained.

* * * * *